(12) United States Patent
Balasubramanian

(10) Patent No.: US 12,263,899 B2
(45) Date of Patent: Apr. 1, 2025

(54) ENERGY EFFICIENT LEGGED MOBILE ROBOT

(71) Applicant: Swaminathan Balasubramanian, Plano, TX (US)

(72) Inventor: Swaminathan Balasubramanian, Plano, TX (US)

(73) Assignee: Swaminathan Balasubramanian, Plano, TX (US)

( * ) Notice: Subject to any disclaimer, the term of this patent is extended or adjusted under 35 U.S.C. 154(b) by 918 days.

(21) Appl. No.: 17/346,461

(22) Filed: Jun. 14, 2021

(65) Prior Publication Data

US 2022/0395974 A1 Dec. 15, 2022
US 2023/0241768 A2 Aug. 3, 2023

(51) Int. Cl.
| | | |
|---|---|---|
| *B62D 57/028* | (2006.01) | |
| *B25J 5/00* | (2006.01) | |
| *B25J 9/16* | (2006.01) | |
| *B25J 13/08* | (2006.01) | |
| *B60R 16/033* | (2006.01) | |
| *B65G 61/00* | (2006.01) | |
| *B66F 9/06* | (2006.01) | |

(52) U.S. Cl.
CPC ............ *B62D 57/028* (2013.01); *B25J 5/007* (2013.01); *B25J 9/162* (2013.01); *B25J 13/088* (2013.01); *B60R 16/033* (2013.01); *B65G 61/00* (2013.01); *B66F 9/063* (2013.01)

(58) Field of Classification Search
CPC .......................... B62D 57/028; B62K 11/007
See application file for complete search history.

(56) References Cited

U.S. PATENT DOCUMENTS

| | | | | |
|---|---|---|---|---|
| 10,719,085 | B2* | 7/2020 | Perkins | B62D 63/04 |
| 10,780,578 | B2* | 9/2020 | Blankespoor | B25J 5/007 |
| 10,800,049 | B2* | 10/2020 | Neville | B25J 3/04 |
| 11,130,235 | B2* | 9/2021 | Rodriguez | B25J 9/1669 |
| 2011/0071677 | A1* | 3/2011 | Stilman | B25J 9/0084 |
| | | | | 700/254 |
| 2021/0402605 | A1* | 12/2021 | Rodriguez | B25J 9/1641 |

* cited by examiner

*Primary Examiner* — Kevin Hurley
(74) *Attorney, Agent, or Firm* — Jason C. Cameron

(57) ABSTRACT

A mobile robot includes a non-inverted pendulum body hereafter referred to as NPB with at least one pivot axis and this pivot axis divides the NPB into two portions. One portion of the NPB contains the center of mass of the NPB that can have structures to carry external payloads. The second portion of the NPB can have one or more manipulator arm and vision units. On the pivot axis is disposed at least one leg rotatabily coupled to the NPB. The other end of the leg has a foot joint on which is disposed a drive wheel or a foot. With additional degrees of freedom for each leg the robot can move similar to humanoids, be able to carry and sustain heavy loads with minimal leg joint torques and/or manipulate heavy loads and forces with self-compensating mass of the NPB while using minimal leg joint torques.

24 Claims, 17 Drawing Sheets

ENERGY EFFICIENT LEGGED MOBILE ROBOT

FIELD OF THE INVENTION

This patent disclosure relates to mobile robots with legs.

BACKGROUND

The biped configuration is common among living species that have evolved from four legged primates that have adapted themselves to use the hind legs for ground support and motion, while the front legs have evolved into manipulators (hands). Most of the robots to date emulating this humanoid structure are inverted pendulum body on legs. An early example is U.S. Pat. No. 6,564,888B1 from Gomi et al. These humanoids that have their center of mass (CoM) on the inverted pendulum body above the leg pivot and need to be always balanced and continuous corrections applied to various joints to keep the inverted pendulum balanced. This is true of inverted pendulum on wheels or legged wheels as well. For activities that involve high external force for instance in lifting heavy weights, these robots need to compensate by moving its body away from the load and the ground contact to counter-balance the weight of the object it is lifting. This adds significant holding torque requirements for the leg joints to hold the position. Even if the holding torques are implemented by using friction brakes which consume very less power, adjusting the joint position will involve large incremental torques when the brakes are disengaged.

Other robots that use movable counterweights to keep the center of mass of the whole system aligned to required point need to drive the counterweight balance with an actuator. This is illustrated in Siltman's U.S. patent application Ser. No. 12/993,650, where Stilman uses a separate chain or balancing body that has an actuator to move the counterbalance mass to counterbalance forces generated by a manipulator or motion activity and maintain the mobile robot in required pose or state of motion. This is illustrated in FIG. 9 of U.S. patent Ser. No. 12/993,650 where the robot has a base wheel to which an inverted pendulum body is connected and to that is connected two independent chain, one chain moving a counterbalance mass and the other chain moving or lifting an external payload. Saunders-et-al U.S. Pat. No. 10,802,508 has a similar concept with the counterbalance mass on an inverted-pendulum body with prismatic legs. The additional actuator to move the counterbalance constitutes additional energy consumption. Besides, the counter-balance actuator may need to be capable of handling larger forces to move the counter-balance weight. This constitutes additional power consumption for mobile robots. The following invention eliminates all of the above-mentioned shortcomings.

SUMMARY OF THE INVENTION

The basic aspect of this mobile robot invention is that the robot consists of at least one leg with one end of the leg connected to either foot or drive wheel and the other end connected to a normal pendulum body (NPB). Since the leg pivot to the NPB lies above the Center of Mass (CoM) of the NPB and if NPB were to be suspended on this pivot axis, it will assume a natural stable position with its CoM below that pivot axis. Each leg can be a single or multiple series link chain from ground contact to the pendulum body. A manipulator can be connected to the other end of the NPB not containing the CoM of the NPB. The manipulator can move relative to the NPB and such a motion would cause a reaction torque at the NPB, balancing the NPB-manipulator. The reactive forces generated by pendulum body tend to attain a stable equilibrium rather than unstable one as in the inverted-pendulum body. Also, any mass addition to the NPB will make it capable for compensating larger manipulator forces. These advantages can be seen in the following detailed descriptions of different embodiment. The leg joints act as a pivot for the normal pendulum body. A dynamic wheeled-foot structure is used for fast navigation across plain surfaces eliminating the need for walk. When the wheels are locked or when the robot is using a foot instead of wheels, the robot can traverse terrains that can be traversed by other humanoids. Another significant advantage of NPB is that it can be used to pick heavier payloads with any picker attached to the manipulator arm or arms, or picker attached to the NPB itself, or in combination with the manipulator and NPB picker carrying different payloads. The net CoM can be held vertically aligned with the gravity vector passing through the ground contact region or in a manner that can be used to induce stabilizing motion to the robot. The structural aspect of this robot and payload carrying mechanics results in least amount of energy spent at the at the leg joints for balancing the payloads. This is an advantage compared to robots and humanoids with inverted pendulum that need to spend considering energy in their hip and knee joints (for instance as humans do when they are dead lifting). This invention also offers energy efficiency advantage when compared to robots that use an additional actuator to balance a counterweight (Saunders-et-al U.S. Pat. No. 10,802,508).

BRIEF DESCRIPTION OF THE DRAWINGS

The accompanying drawings are presented to aid the description of the invention and are to be considered as illustrations of the embodiments and not limitations thereof.

FIG. 15C is the lateral view of the same illustration.

DETAILED DESCRIPTION

Figure 1:
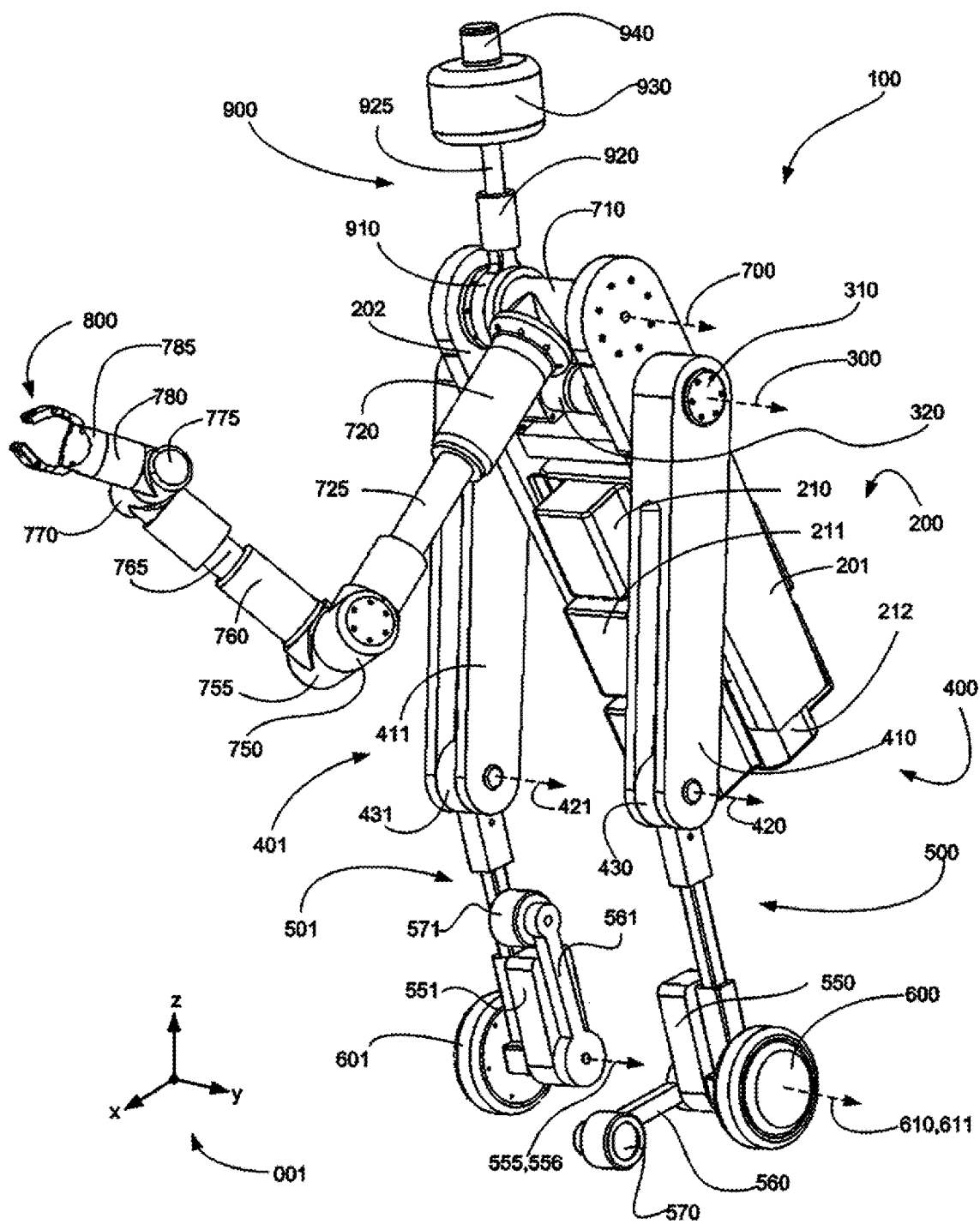
FIG. 1 represents the robot with single manipulator arm, the pendulum body with attached payloads, and wheels on legs.

FIG. 1 represents an implementation of the robot 100 with a non-inverted or normal pendulum body (NPB) system 200 with the pivot axis 300 on a wheeled leg 400, 401, 500, 501, 600, 601. In this implementation the NPB system consists of body frame 201, 202 for left and right side, respectively. NPB holds the payloads 210, 211, 212 with one or more of the payloads being a power source such as battery. All these payloads are removable, and exchangeable. The structural mass of the NPB with or without any of these payloads the CoM of the NPB is expected to be closer to ground relative to the primary pivot axis 300 hereafters referred to as PPA, when the robot is in a vertical pose as shown in the FIG. 1. The coordinate system 001 represents the coordinate system of the world and the gravitational axis is along the negative Z axis. The leg system consists of the upper leg system 300,400 and the lower leg system 500. 410, 411 represents the upper leg frames for left and right legs, respectively. The upper leg consists of the primary pivot joints 310,311 hereafter referred to as PPJ, are driven by the actuator system 320. In this embodiment each of the joints 310 and 311 has an independent actuator in 320, to rotate each leg independently. In other embodiments where a differential motion of the leg may not be required, each leg can be tethered to the other leg, and one actuator used for driving common for joints 310 and 311. The second leg joints 430, 431 along the axis 420,421 respectively, in combination with the joints 310, 311 at the pivot axis 300 can be positioned such that the manipulator axis 700 and the NPB can be positioned at various heights and orientation from the ground and the CoM of the robot can be moved to within a required range from the wheel axis 610,611 for each of the various heights of NPB 300 and manipulator base axis 700. In alternate possible embodiments, the additional axis 420, 421 may be absent and in those embodiments the height and the center of mass may not be independently positioned. 600, 601 are the primary drive wheels that support and move the robot in a terrain or ground. These drive wheels may each have actuators to actively drive each wheel independently and/or in combination with brakes to hold the wheel in a position. In the illustrated embodiment in FIG. 1 each of the legs can also include retractable secondary foot wheels 570,571, and these foot wheels are connected to the legs through links 560, 561 to joints 555, 556. The links 560, 561 are rotatably coupled to the legs along the axis 555, 556. The joint units 550, 551 contain actuators that can be driven independently or in combination with elastic elements or be partially or completely tethered to the knee joint 430, 431. The embodiment in FIG. 1 includes a manipulator arm unit consisting of joints 710, 720, 750, 760, 770 and 780 constituting six degree of freedom. The whole manipulator Arm ensemble from 710 to 800 is hereafter referred to as Manipulator Unit or MU. The end-effector joint 780 may also include many possible end effectors such as grippers, vacuum grippers, claws, tool attachment units etc. This embodiment illustrates a gripper unit 785,800 attached to the end effector joint 780. The embodiment in FIG. 1 also includes a vision unit that is attached to the NPB through a rotary joint 910. In this embodiment the rotational axis of 910 coincides with 700. In this embodiment, the vision unit has a camera and radar system 930, and a Lidar unit 940. The vision unit also includes a prismatic joint so that the distance between the vision unit base joint 910 and 930,940 can be altered. The units 920, 925, 930, 940 may hereafter be collectively referred to as Head Unit or HU. Nevertheless, an embodiment can include a vision unit anywhere either in the manipulator arm at any of its joints or on the NPB or both and can have more than three degrees of freedom to orient itself from the NPB or the Arm, without departing from the spirit and scope of this disclosure.

Figure 2:
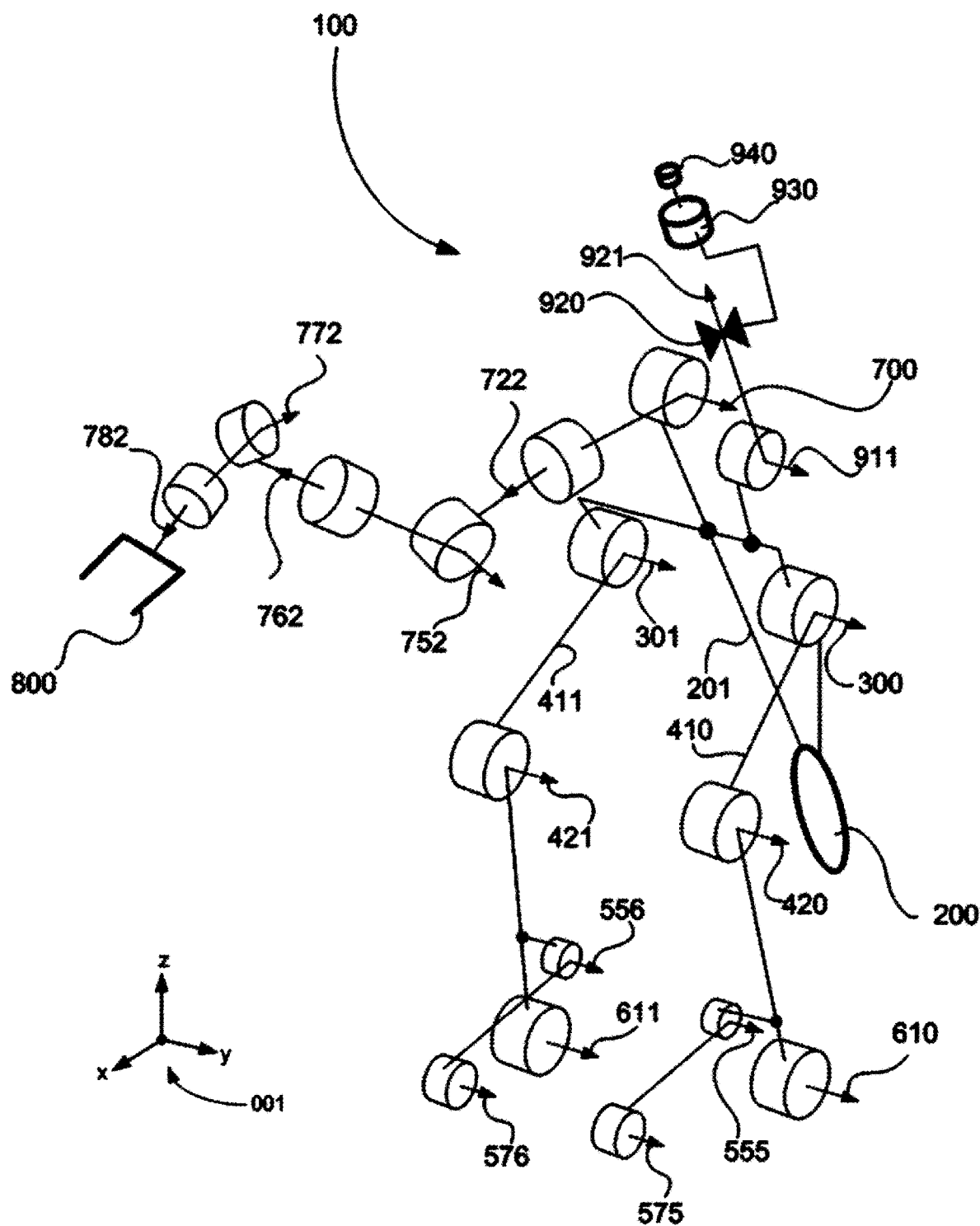
FIG. 2 represents the joint coordinates diagram for robot in FIG. 1

FIG. 2 illustrates all the joint coordinates and their revolute and prismatic axis for robot in FIG. 1. 200 represents the center of mass (CoM) of the NPB, and the link 201 represents the NPB frames 201, 202 in FIG. 1. 300, 301 are the left and right leg NPB pivot axis, respectively, 700 is the base axis for six degrees of freedom (6dof) manipulator arm having axis 700, 722, 752, 762, 772, 782. The base axis for the vision and lidar system is 911, 920 is the prismatic joint along the prismatic axis 921, 930, 940 represent the vision and lidar units, and the whole ensemble from 911 to 940 is hereafter referred to as the Head Unit or HU. In general, the base axis 911 of HU may or may not be coincident with the manipulator base axis 700, and the manipulator base axis 700 may or may not be coincident with the NPB pivot axis 300, 301. The axis 420, 421 represents the knee rotational axis of the respective legs, in series with the primary foot wheel axis 610, 611. The axis 555, 556 represents the rotational axis for the retractable secondary foot wheels represented by 575, 576 and causes the foot wheel to be deployed to allow the secondary foot wheels 570, 571 in FIG. 1 to contact the ground and provide additional support. In different embodiments the foot axis 556 and 556 may or may not be coincident with the primary wheel axis 610, 611.

Figure 3:
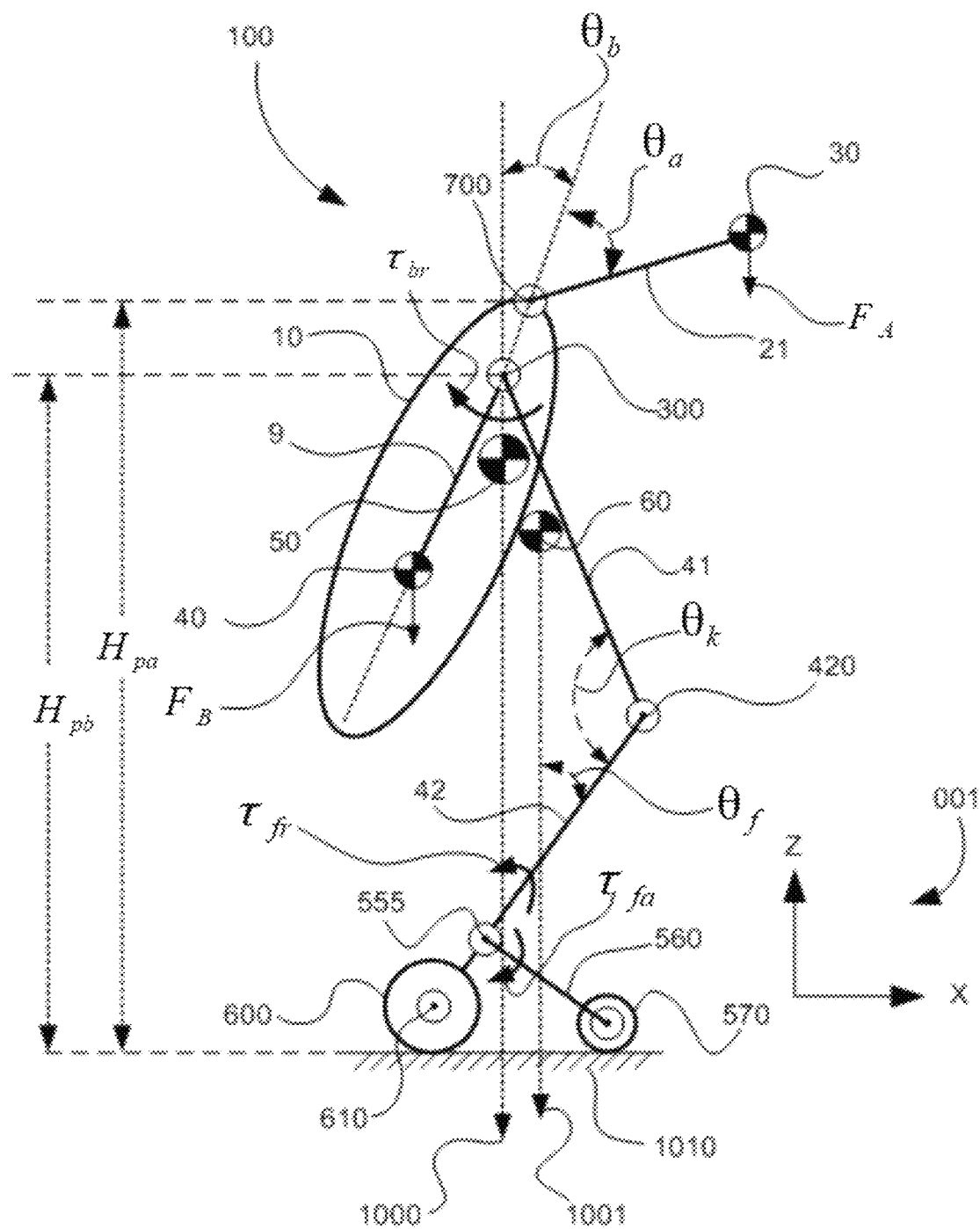
FIG. 3 represents the general concept of the robot with CoM of different parts, forces acting on the joints and joint angles of the leg portions, and the secondary foot wheel deployed.

In FIG. 3 is a simplified functional representation of the robot in FIG. 1. The effective CoM 40 of the NPB 10 lies below the pivot axis 300. The CoM 30 is the effective CoM for the HU and MU; the CoM 50 is the net CoM 40 of NPB and 30 of MU and HU. The CoM 60 is the net CoM of the whole robot including CoM of the legs. The CoM 50 expected to coincide with the vertical gravitation axis 1000 containing the pivot axis 300 for static equilibrium, and the robot will operate in a power efficient mode. In static equilibrium, force $F_A$ is counterbalanced by the force $F_B$ retaining 50 at 1000. For a statically stable condition of the robot, the CoM 60 needs to remains at the gravitational axis 1001 passing through 610 or in the region between 610, and ground contact point and 570 when the secondary foot wheel is deployed. Any increase in $F_A$ and/or an increase in distance of CoM 30 from 1000 would cause the reaction torque $\tau_{br}$ to increase $\theta_b$, increasing the distance of CoM 40 from the 1000 axis and hence maintaining CoM 50 at 1000. In most cases compensatory torque at the PPJ at 300 will need to be applied, in addition to $\tau_{br}$ to overcome frictional and dissipative forces of the joint and the actuator.

Figure 4:
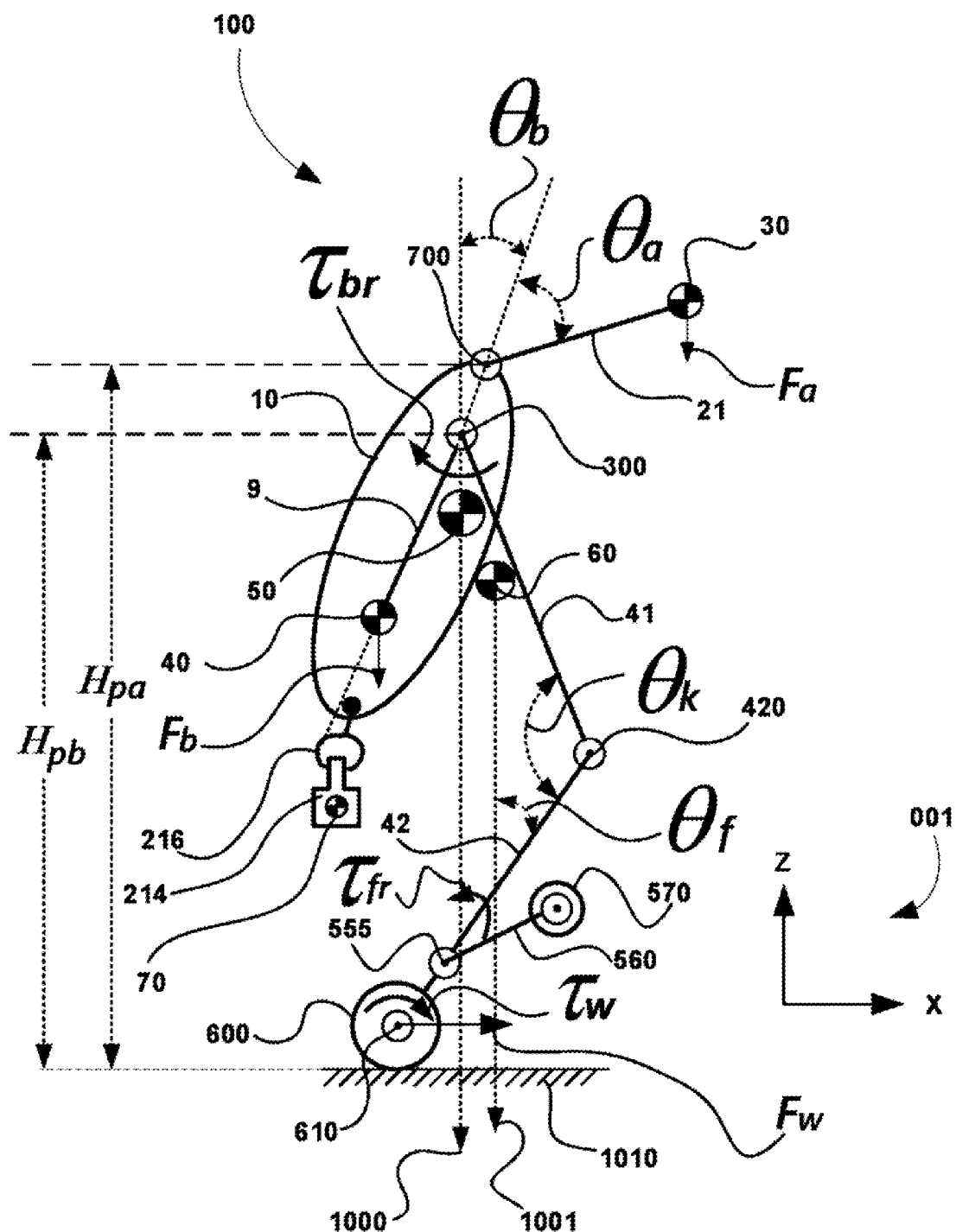
FIG. 4 represents the general concept of the robot with the secondary foot wheel retracted and with a single contact point with the ground for each wheel.

When the secondary wheel is deployed the CoM 60 can lie between 610 and ground contact zone of 570. A finite holding torque $\tau_{fa}$, can keep the foot 560 from folding in and the robot tipping over. This feature is especially useful when the arm motion and activity causes the robot to re-adjust its position of NPB CoM 40 to compensate for changes in CoM 30 to attain equilibrium or delay any adjustment to the CoM 60. In implementations without foot wheel 570, any torque adjustment to 300 may require compensating torque at 600,610, for dynamic equilibrium. For cases that requires the foot to be perched in one place, brakes on the wheel 600 can be activated to provide maximum static friction while the actuator at the foot joint 555 and knee joint 420 can provide a holding torque, and torque necessary to cancel any disturbance/reaction torque transmitted to the legs from the MU actuators. In one example $F_A$ can be oriented such that it has a component along the positive X-axis in 001. If for compliance reasons, 700 needs to stay in place, there are at least two ways to handle this. One method is to give an impulse acceleration to the wheel 600 along the X direction such that the CoM 60 falls to the left of 610. The torque generated at 700 by the misalignment of CoM from 610 will counterbalance the X component of $F_A$. Even though holding 700 in place using this technique is extremely hard, it is possible using a detailed model of the system. In another method if the wheels 600,601 were to be held in place, then a negative torque (using right hand rule convention) $\tau_{fa}$ can be applied to counter act this additional X component of force at 700. In another example, if the manipulator moves its base actuator at the axis 700 rapidly in such a way that $\theta_a$ would increase while causing a reaction torque (at 300) to be greater than and in the opposite direction to the restoring torque $\tau_{br}$. When the wheel brakes of 600 are engaged the ground wheel friction reaction will cause the robot to move or rotate to the left along the 610 axis. With the foot wheel deployed, the robot can still hold in place by relaxing the torque $\tau_{fa}$. In another example, MU can move in such a way so as to alter the CoM 60 to move to the right (when the actuator at 300 is held and no counterbalance action happens). $\tau_{fa}$ can be increased to hold the robot in place. When the CoM is at a desired zone between 600 and 570, or beyond 570, the secondary foot wheel can be retracted, and a forward torque applied to the primary wheel for forward acceleration. Closer the CoM 60 to 570, faster the robot will be able to accelerate once $\tau_{fa}$ is removed. This allows for faster forward acceleration without the robot tipping backwards. This is shown in FIG. 4 with the secondary foot wheel 570 completely retracted and not in contact with the ground, while the CoM at 1001 is away from 610, and $\tau_w$ is applied to the primary wheels to accelerate the robot in X direction of 001. The dynamics of motion is also different from those are implemented as inverted pendulum above the PPA. In this case, any disturbance to NPB through actuation of PPJ will result in recovery due to the tendency of NPB to move back to equilibrium. This results in smaller compensatory motion. Whereas in inverted pendulum configuration, any small perturbation to PPJ will result in a higher non-equilibrium and a self-sustaining fall that need to be rapidly compensated. In summary, having the pivot axis 300 located at a balancing pivot point, contributes significant energy reduction while carrying to heavy payloads. In contrast a humanoid or robots that have inverted pendulum body from pivot axis 300 (moving 300 to well below 40 represents an inverted pendulum configuration), will require significant pose changes to the joints at 300, 420 to bring the effective CoM to an equilibrium location, and hence constitutes significant holding torques for those structures. This is well known from human experience of dead lifting.

Figure 5:
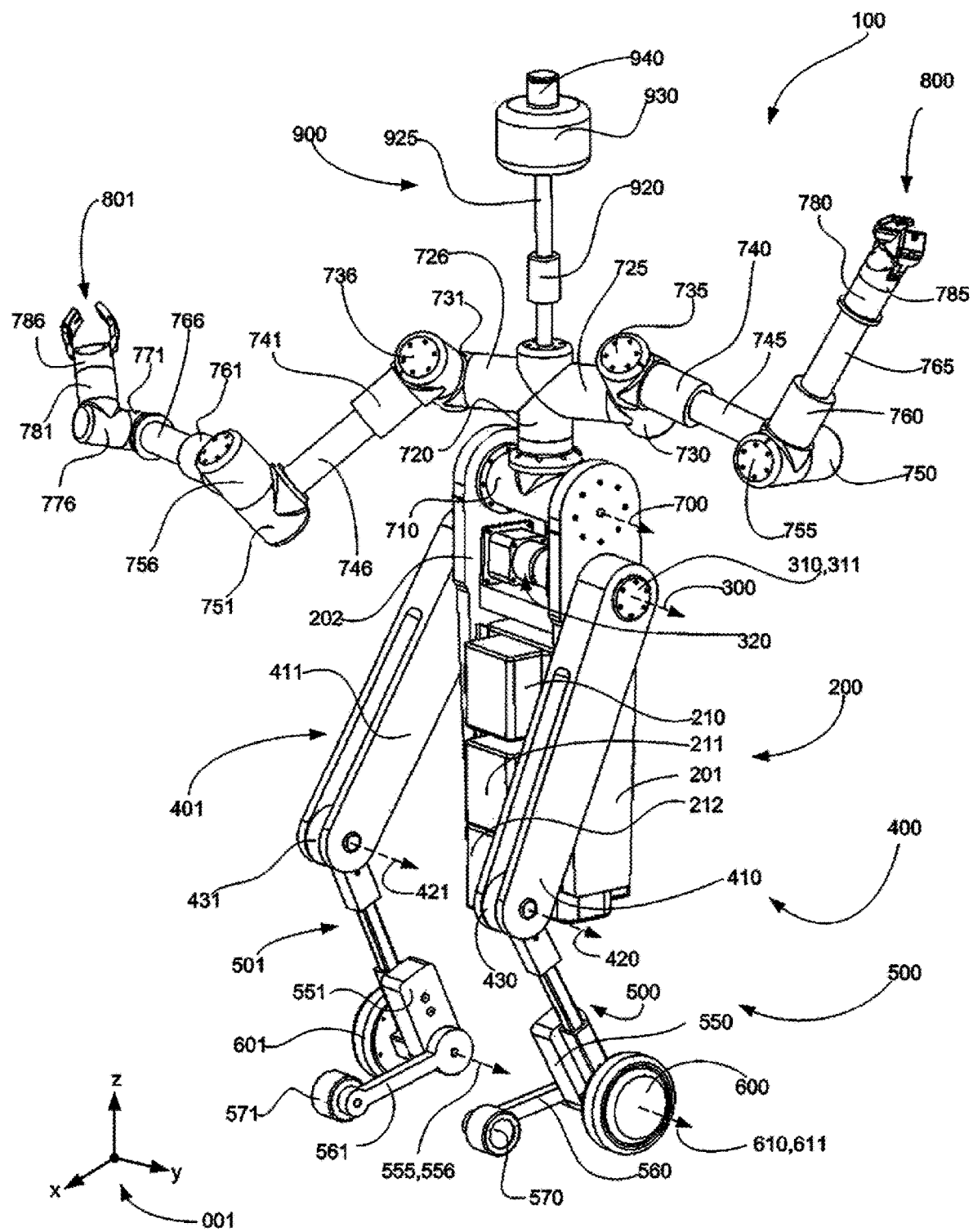
FIG. 5 represents the robot with dual arm with common spine between arms on wheeled legs.
Figure 6:
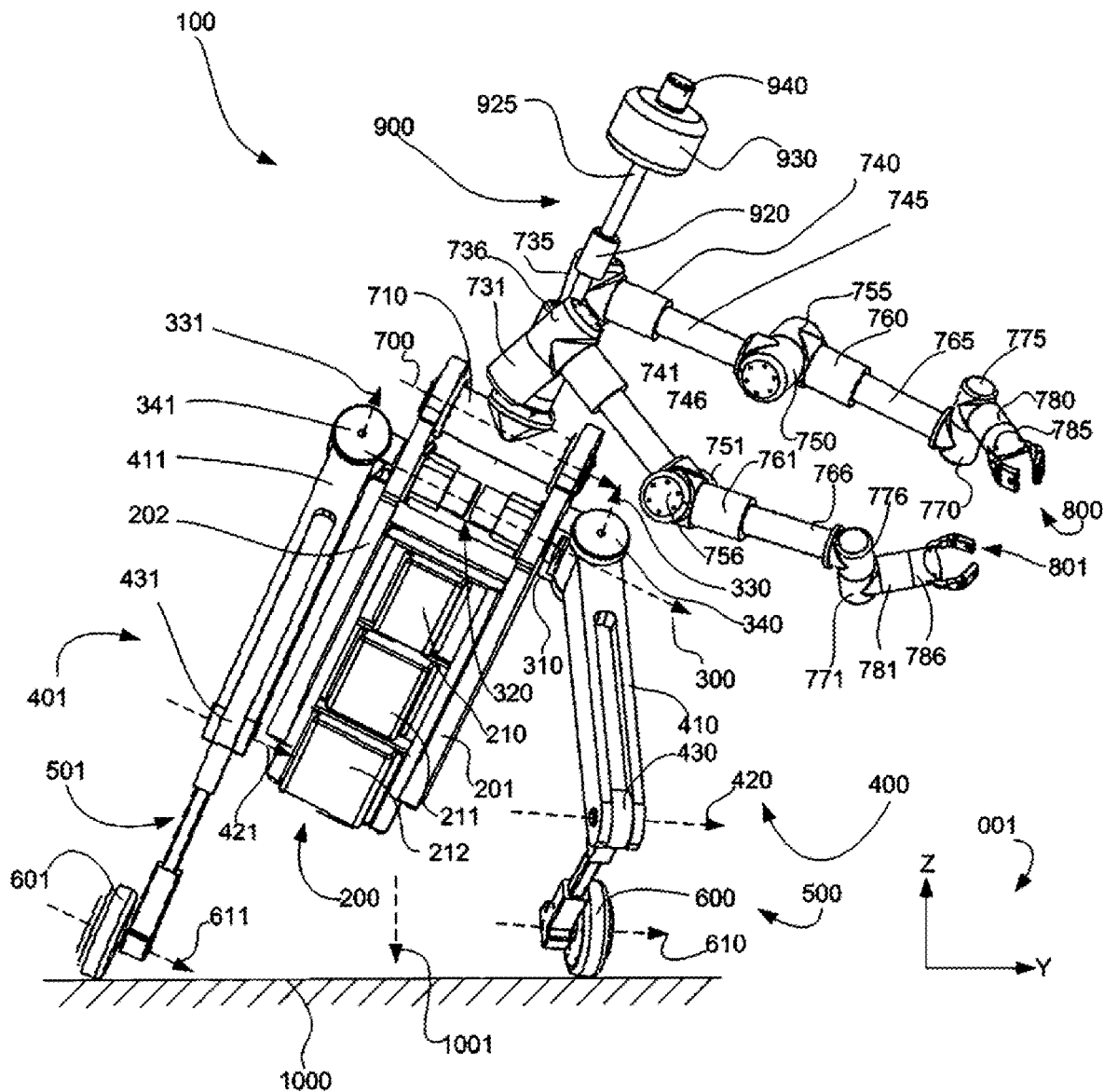
FIG. 6 represents additional degree of freedom at for each leg with additional joint at the primary pivot position.
Figure 7:
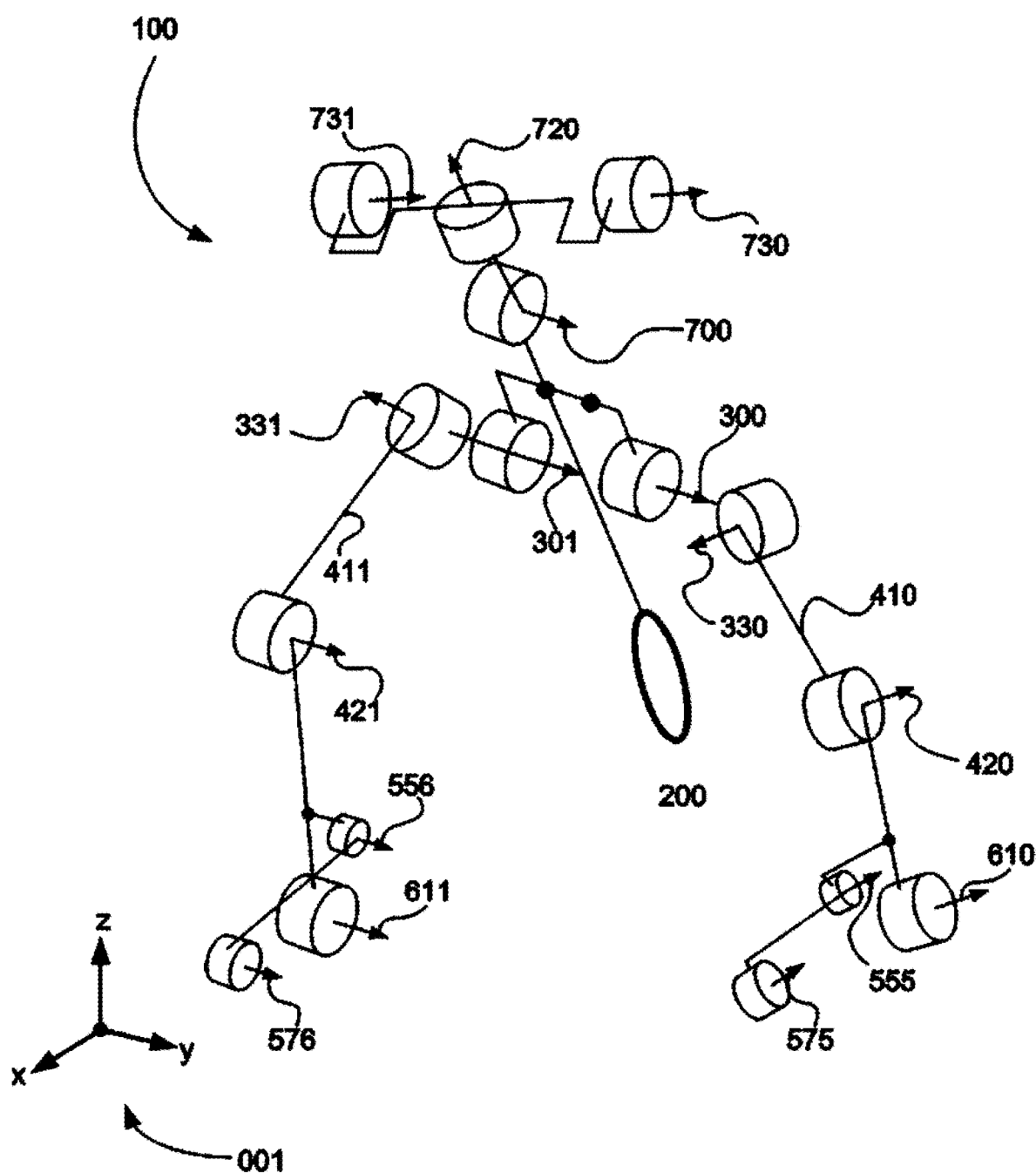
FIG. 7 represents the joint axis diagram for the robot in FIG. 6
Figure 8:
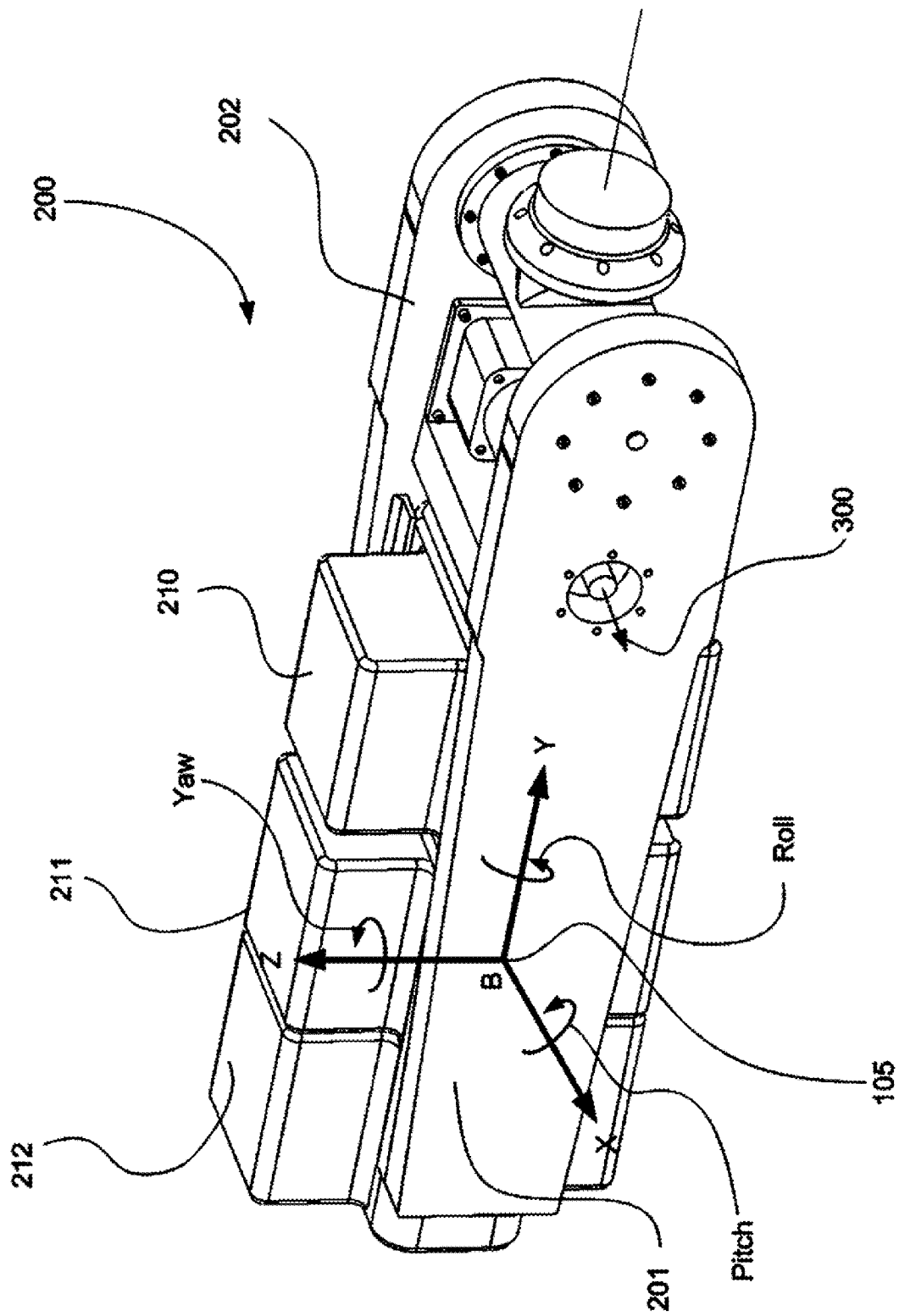
FIG. 8 represents the robot body axis in the pendulum body frame, with each axis representing Pitch, Roll and Yaw, in the NPB frame.

FIG. 5 illustrates another embodiment with a dual arm system on an NPB. The manipulator base 710 is similar to the single arm base in FIG. 1. The Central spine 720 containing the arm has a revolute joint axis (720 in FIG. 7) perpendicular to 700, and parallel to the roll axis in the NPB frame (FIG. 8) and gives a twist to the spine containing the dual manipulator arm. In this embodiment the left arm system 725-800 has five degrees of freedom and the right arm system 731-801 has seven degrees of freedom. In other embodiments each arm can have same more different degrees of freedom without departing from the spirit of this innovation. The robots in FIG. 1 and FIG. 5 can swing the arms to the side or manipulator objects to the side, the side direction being referred to is along the X axis in the NPB frame (FIG. 8). The movement of CoM along the X axis in the NPB frame can be counter-balanced by altering leg height on the opposite side to the load. To enhance side load manipulation capabilities an additional joints 340, 341 in FIG. 6, with axis 330, 331 shown in FIG. 7, can be included at the primary pivot axis perpendicular to the primary pivot axis for each leg. These additional joints here after referred to as the Secondary Pivot Joints (SPJ) allows the NPB to yaw along its Z axis in the NPB frame. A typical side pose for the robot is shown in FIG. 6. The extension of the left leg 410 along the Y Axis of the world frame allows the robot to significantly increase the manipulator arm to reach along the Y axis, while the lower portion of the NPB base sways towards the negative Y-Axis of the world frame. The joint holding torques at 340 can still be low due to the balancing action happening to the side of the robot. This again reinforces the advantage of the NPB structure and how it can be used to lower energy consumption.

While in forward turn motion along the Y axis in 001, the robot in FIG. 6 can lean on one the wheel inside of the turn radius with most of center of mass lying on that inside wheel, and the outside wheel can stay afloat or just about give enough support or can side slip easily into the turn. In general, this side slip can be minimized or eliminated by correct rotational speed of the wheel in the outer radius of the turn.

In alternate embodiments, the Second Pivot Joint can precede the Primary Pivot joint. The hip joints at the pivot axis 300, 301 can have 2 or 3 degrees of freedom joint for more versatility of motion and additional redundancies, without departing from the spirit and scope of this disclosure, and the use of NPB as a leverage.

Figure 16B:
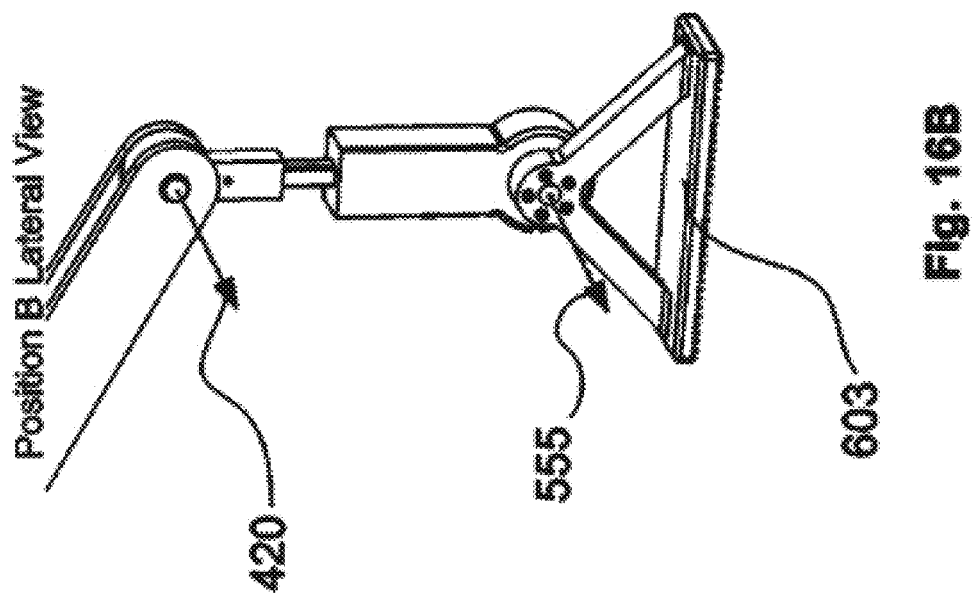
FIG. 16B illustrates a foot structure attached to the leg through a foot joint.
Figure 16A:
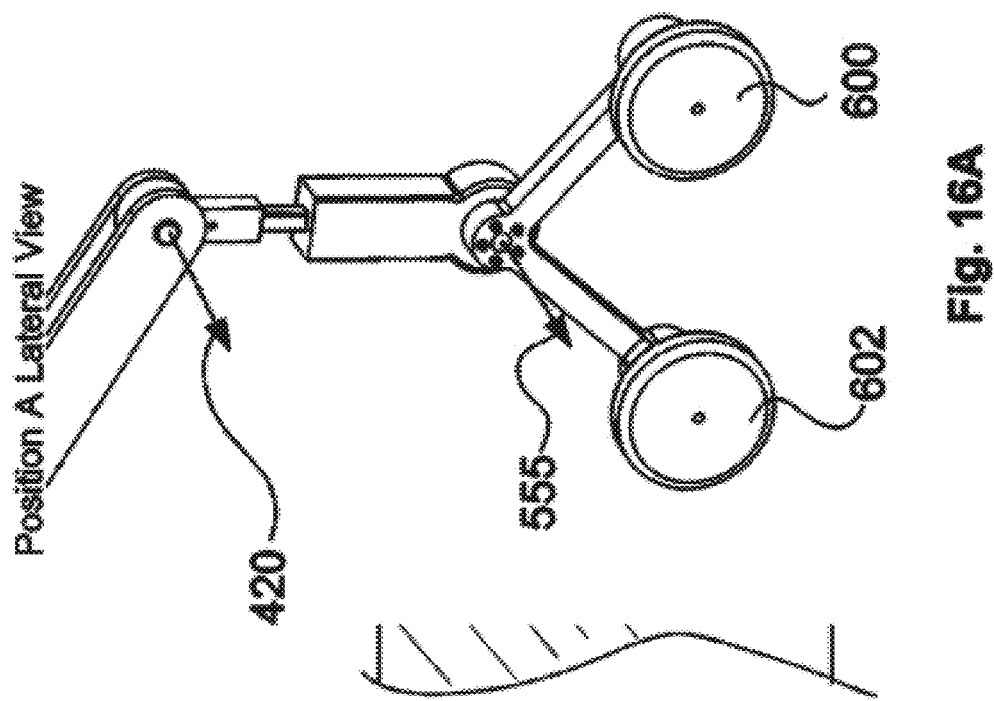
FIG. 16A illustrates a dual wheel structure with a foot joint.

FIG. 16 illustrates some alternate foot wheel structure and foot structure instead of wheels that can be used with all the embodiments described in this disclosure. FIG. 16A shows dual drive wheel structure instead of primary and secondary wheels. Either of the wheels can act as a primary and secondary wheel. The advantage with this structure is that the CoM of the robot can be targeted to lie between 600 and 602 while the holding torque at the foot joint 555 can be minimal compared to other embodiments discussed. The FIG. 16B shows the foot structure 603 instead of foot wheel, as in other humanoids. Addition degree of freedom can be added to the foot joint so that leg can be oriented at any angle related to the foot axis (length of the foot shown in FIG. 16B.

Figure 9:
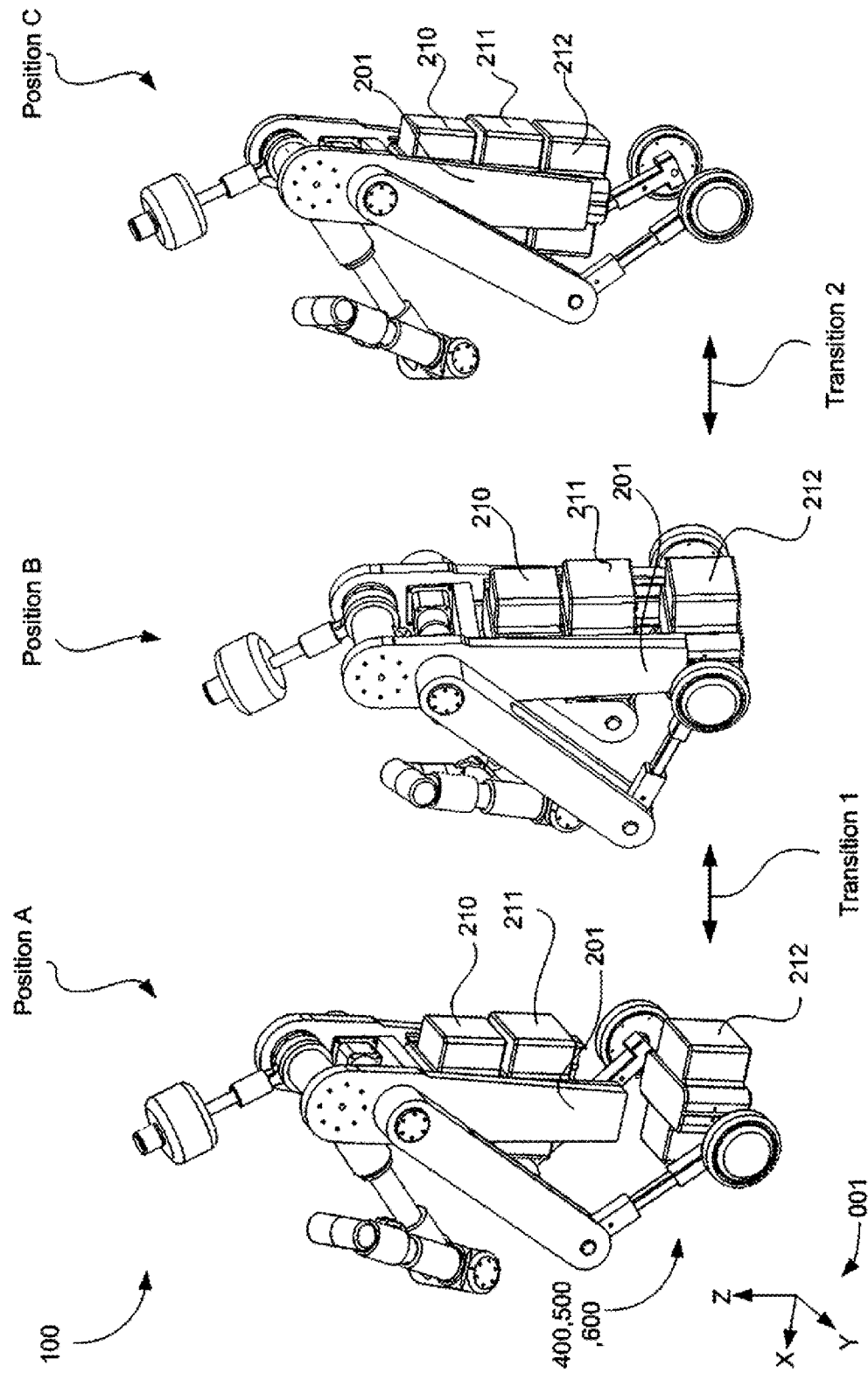
FIG. 9 is an illustration of payload loading and unloading in vertical direction to the NPB.

FIG. 8 shows the current embodiment of the NPB itself. The batteries or power supply units or payloads are 210, 211, 212. These units can be replaced autonomously as illustrated in FIG. 9. Each unit can be either removed and put back by moving along the Z axis or along the Y axis. A latch or lock or attachment mechanism with a detachable connector system can lock or release the payload units when appropriate, and commanded or controlled by the robot controller. FIG. 9A, B C illustrates the sequence for attaching or removal of a power source unit or a payload unit along the NPB frame Y axis. The robot could use an object sensor such as the image sensors in the head unit 900 in FIG. 1 or additional laser or object sensors attached to the NPB itself, to locate and lock on to the location where the payload unit is located. After moving the NBP over the power unit as shown in FIG. 9A, the robot can lower the NPB by adjusting the leg joint angles, insert the payload into the provided slot over the guide rails, and lock once in place. As shown in FIG. 9B the robot can lift back again to continue its operation. When these payloads are power sources, they not only help the robot extend its operational energy, but also increase the distance of the CoM from the pivot axis 300 so that the robot can exert higher forces and lift heavier weights with its manipulator arm. Detaching the payloads is in the reverse order as shown in FIG. 9C to FIG. 9A. The lock or latch mechanism need not be limited to mechanical; it can be any mechanism including electromagnetic, magnetic etc. The mentioned mechanism is only an illustration and not intended to be a limitation thereof.

Figure 11:
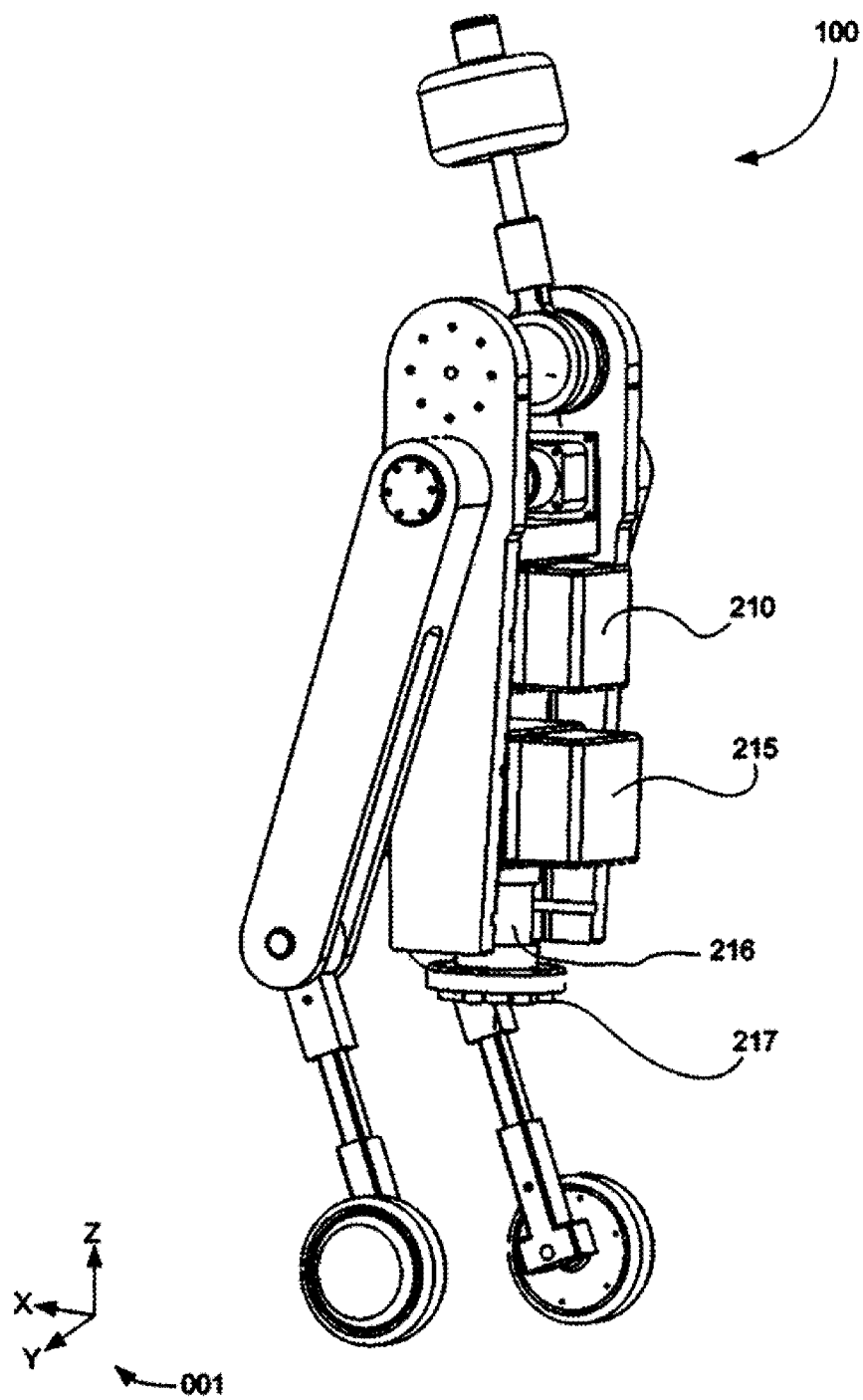
FIG. 11 is an illustration of the robot with a Vacuum Payload Picker.

In other embodiments, the robot can be used to lift payloads which may not necessarily be power units or payload units uniquely designed to fit into the NPB. The robot on FIG. 11 has an attached vacuum gripper, and the vacuum gripper as a tool can itself be picked up and fixed to the robot autonomously similar to the payloads shown in FIG. 9. Once fixed the robot can pick other payloads such as boxes in a warehouse, using a similar procedure in shown in FIG. 9 except that the vacuum gripper can be enabled to pick and release the payload boxes. Once payloads are picked by the vacuum gripper, the robot can raise itself and transport to a desired place and release by lowering and releasing the payload from the vacuum gripper. For these operations robots without MU can be used as well. Robots with MU can be useful even for transporting boxes that may be placed at higher levels. Once the robot moves the boxes closer to its destination, it can release the payload to the ground and use the manipulator to pick the payload and place it at a higher level. This again avoids use of excessive power compared to the case where the whole transportation is done with the manipulator arm picking and holding the payload all the time.

In FIG. 9, for payloads 210, 211 that are attached deeper into the NPB, it is still possible to load vertically as shown in FIG. 9 as long as those payloads are placed on the ground at appropriate heights or stacked. They can also be manually inserted or removed in the vertical direction. Other embodiments without altering the key elements of this innovation, could include an in-build picker that travels in the vertical direction with a prismatic joint attached to the NPB. The robot can then pick the payload into the NPB vertically using the prismatic joint mechanism in addition to being able to move the NPB vertically as well.

Figure 10:
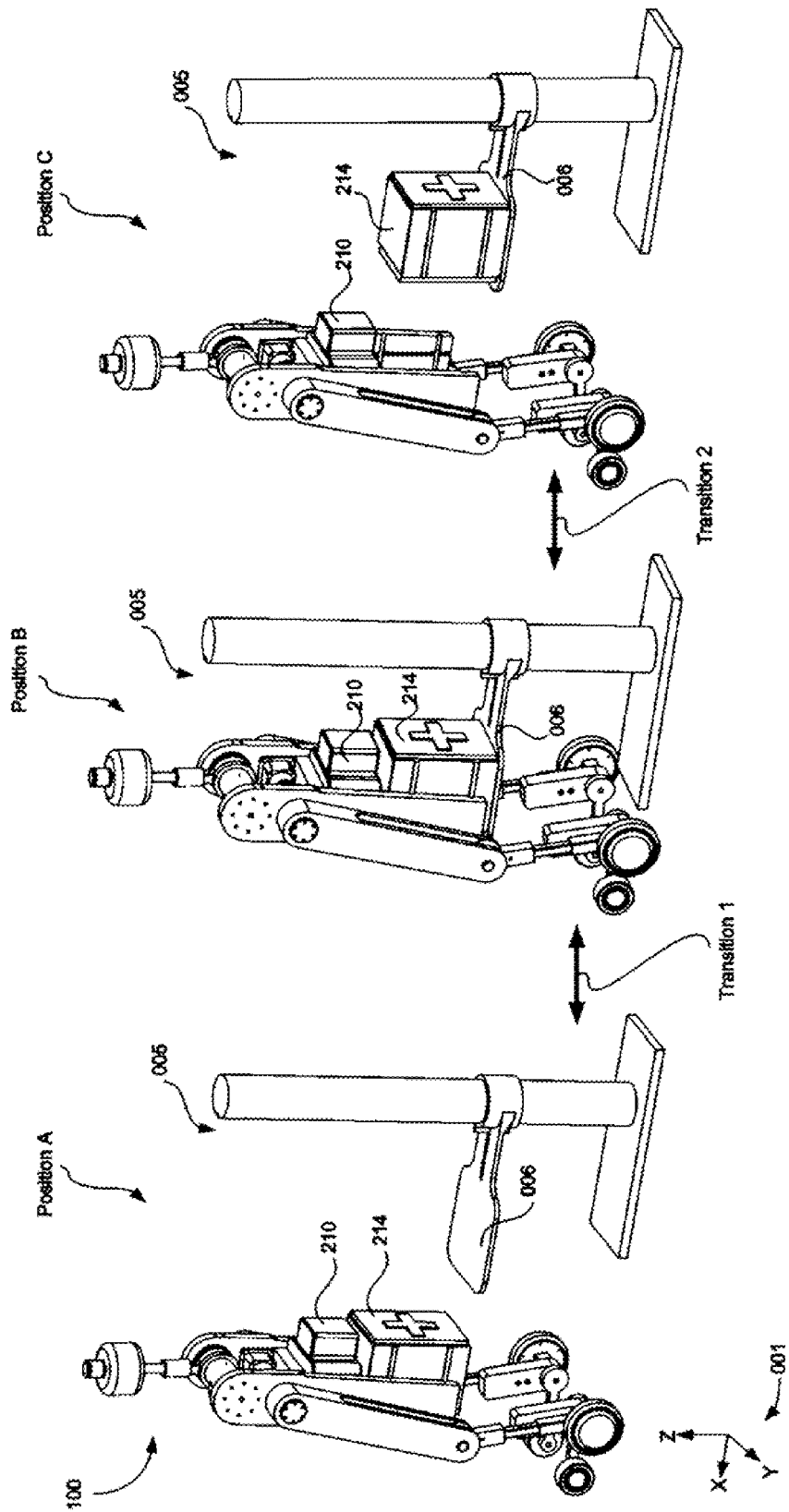
FIG. 10 is an illustration of addition payload loading and unloading in horizontal direction to the NPB.

Other embodiments could allow payloads to be loaded horizontally along Z axis of the NPB frame or X axis in 001 of FIG. 10. The payload 214, may or may not contain power sources, and could be any useful payload to be transported, and they can be loaded in the horizontal direction. FIG. 10F shows the payload placed on an adjustable height stand 006, The robot can move along X axis on 001 towards the payload, slide the payload into the NPB by aligning the guided rails of the payload and the NPB, and once the payload is in place, latch and move away from the stand to any desired location. As in FIG. 10D. Unloading is reverse of what is described for loading. In other embodiments one could have a mechanism in the stand 005, 006 such that the payload remains held to the stand with a lock mechanism on the stand while unloading or loading. The robot can communicate wirelessly to the stand and command to release or hold the payload. In alternate embodiments, the NPB may not have guide rails, and just have self like structure to carry payloads.

Figures 12A, 12B:
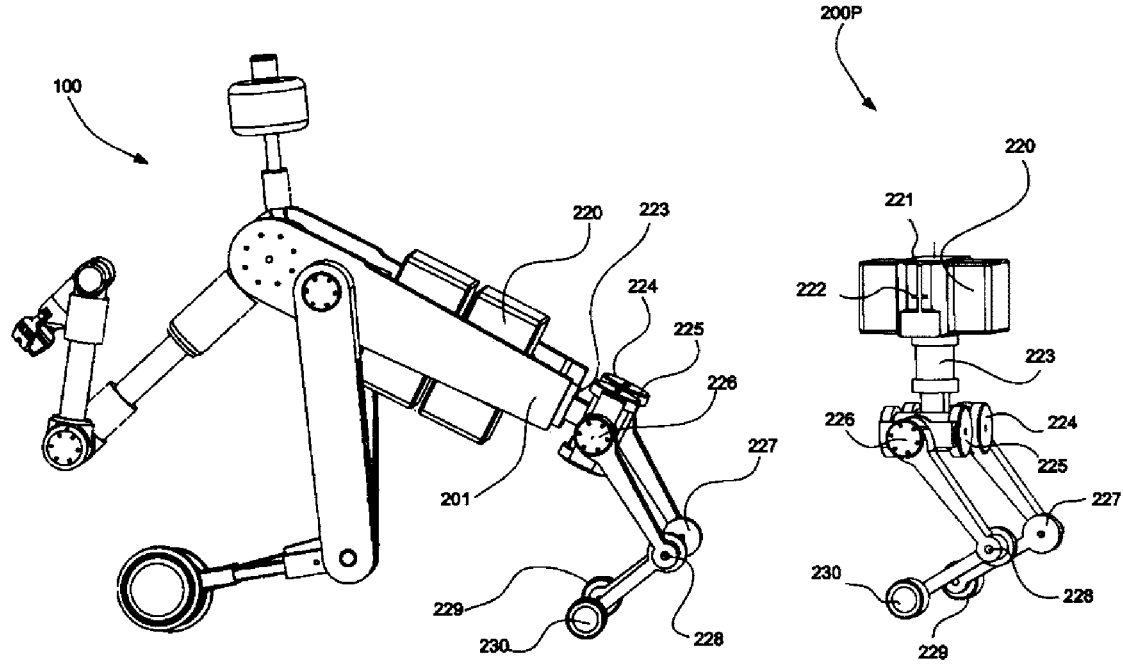
FIG. 12A represents the robot with a detachable second pair of legs, 12B represents those second pair of legs, 12C represents the robot with an additional wheel unit, 12D represents that wheel unit.
Figures 12C, 12D:
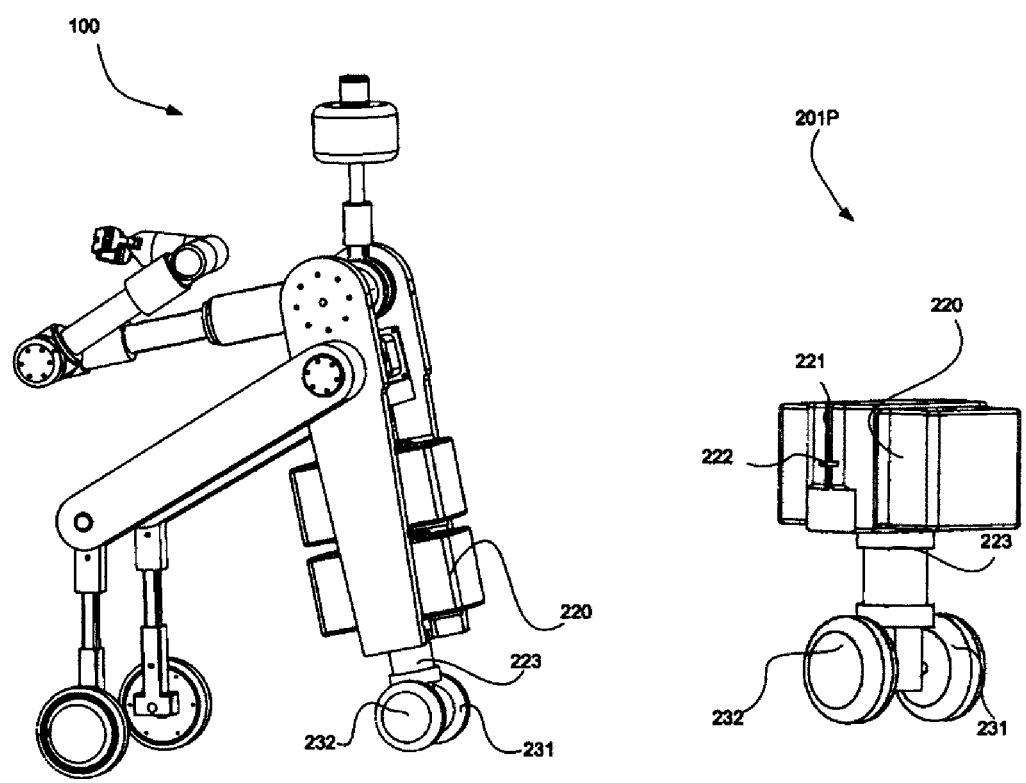

FIG. 12A, FIG. 12B, FIG. 12C and FIG. 12D illustrates another embodiment that uses the NPB capability to load and unload payloads. Here the robot can attach a second pair of wheels to itself and turn itself into a four wheeled kind of vehicle. FIG. 12B shows a stand embodiment of another smaller two-legged robot. This robot has an attachment 220 that fits the payload formfactor that will fit into the NPB as a payload would, with guide rails 221 and lock slot 222. In addition, this has two legs, and each leg has 3 degrees of freedom not including the wheel at the end of each leg. When this is attached to the robot 100, the whole robot can now be operated as a four-legged robot by synchronizing communication and action between the smaller and the NPB robot. This four-legged transformed robot can be useful for traversing extremely challenging terrains. FIGS. 12 C and D illustrates a similar concept with the payload 220 on wheels 231, 232. This can be useful, for instance, to supply power to the robot by allowing the battery to drive itself to the robot, if the robot for cannot travel or is too busy to pick up a fully charged power source while it runs out of battery it could let a charged battery run to it. The self-driving battery can also have multiple stacks of battery, be guided by a drone, or have its own navigation equipment. The payload can also be a robot similar to the NPB robot or any robot that can work with the NPB robot to provide additional ground support. The payload mentioned here is not a limitation but just an illustration of the advantage of the NPB structure that can easily accommodate and attach another functioning robot to form a more robust and stable structure in addition to providing additional power to the NPB robot.

Figure 13:
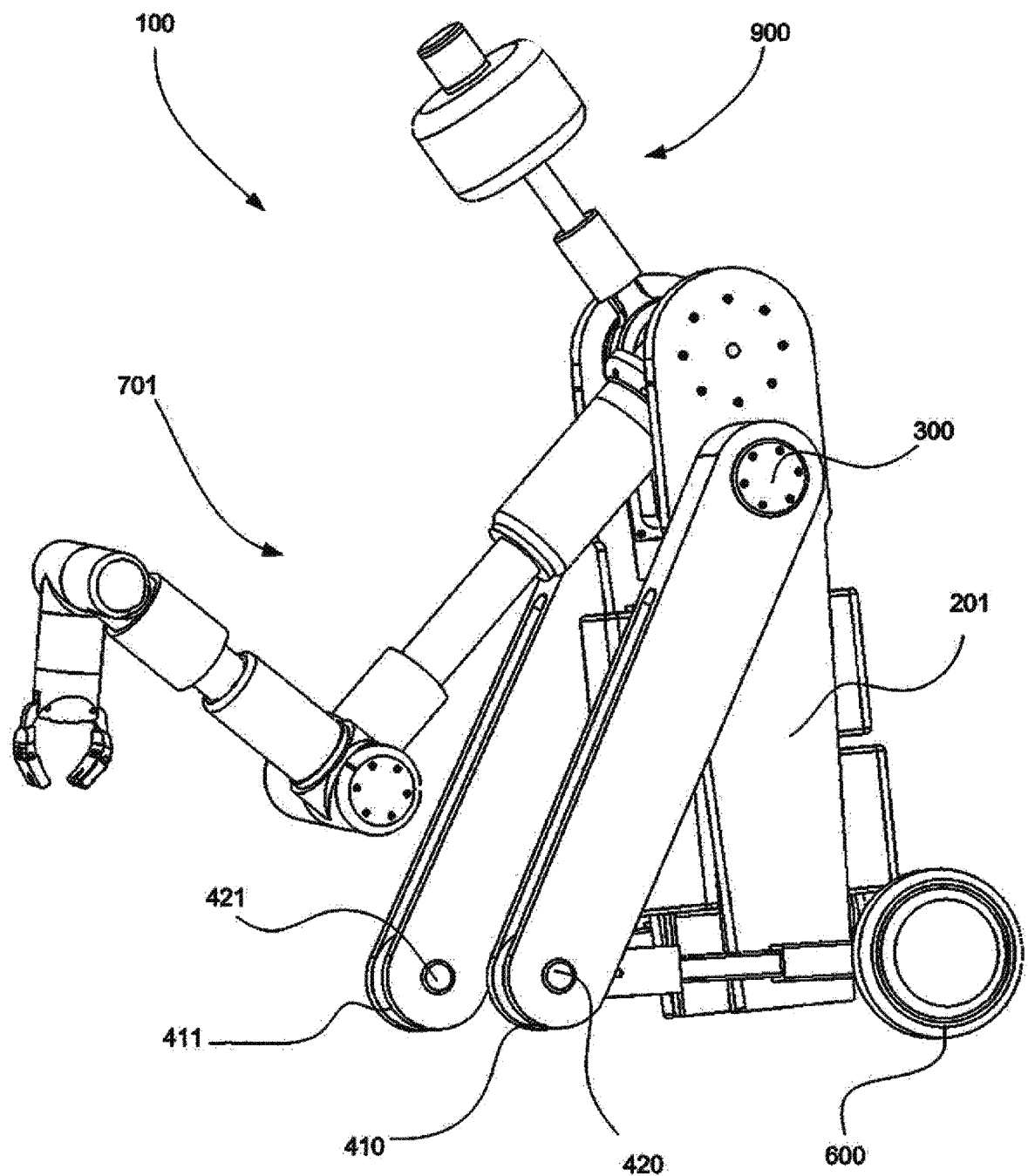
FIG. 13 is an illustration of the robot in a sitting position.

The most common position from reset is shown in FIG. 13. The robot is vertically sitting on a flat surface or ground, while the wheels can be taken off the ground. This position can however be unstable if the arms expend too much out or there is an external force acting that may topple the robot. The legs can be extended in a manner such that the leg frame 410, 411 containing the knee joints 420, 421 can rest on the ground providing extra support. The sitting pose can also be used for manipulating objects or loads, and the robot's CoM can vary between the contact points of 410,411 and base of 201 or the wheels 600, 601 if they are touching the ground as shown in FIG. 13. The simplest way to get the robot base 201, off the ground (standing pose) if to bring the wheels 600, 601 on the CoM of the robot and adjust the leg joint coordinates to move the NPB in a vertical trajectory. In cases where the payloads are unknown and hence the CoM and the secondary wheel is absent or not deployed, one method is to bring the wheels close to a previously known location of CoM, and try a vertical trajectory lift of the NPB. If the CoM has shifted, a horizontal shift in NPB can be detected and corrective wheel torques applied to find a stable position of the leg joints that will induce zero moment at the ground contact zone of the legs. Once the CoM of the robot is known, the leg joint angles can be changed to attain a required height, leg joint angles configured to minimize the pose holding energy.

An alternate method to determine the CoM of the robot while in the sitting pose is to use the previously known or a pre-determined best guess position and trying to vary the leg joint angles to vertically lift the NPB, while the wheels can be in a torque detection mode. If the gravitation vector passing through the CoM passed through the wheel, the torque detected on the wheels would be zero. For a positive and negative torque, the legs can be retracted and deployed at a better estimated position on the ground, and this can continue iteratively until the CoM gravity axis lies at the wheel ground contact point.

In another method, the manipulator arm position can be adjusted about the axis 700 so that the CoM and the gravity axis aligns with the wheel ground contact zone. However, the manipulator arm needs to be adjusted slow enough so as to not topple the NPB by induced strong reaction forces at the NPB-manipulator joint 700.

Figure 14:
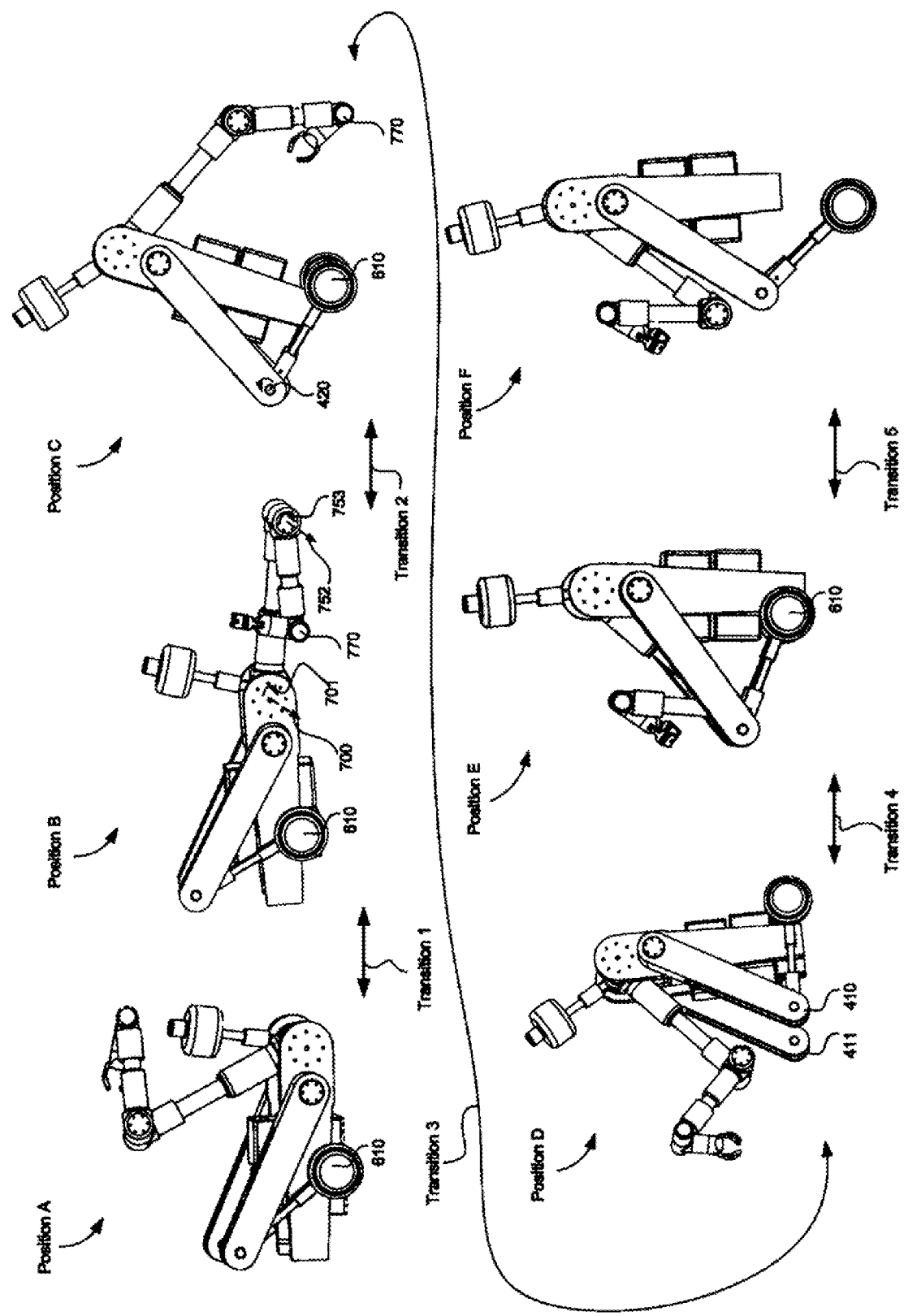
FIG. 14 is an illustration the sequence of the robot going from a horizontal down position to sitting and then to a standing pose.

For embodiments that use the deployable secondary wheels, torque at the joint 555, 556 axis can be used to determine the location of the CoM by following the above procedure. However, instead of iterating, if the location of the CoM lies within the secondary and primary wheel ground contact and the robot can immediately be raised by continuously adjusting the holding torques at 555, 556. The joint angles can then be adjusted to minimize all holding torques for a given pose. If a robot is in a toppled or sleeping position as shown in FIG. 14 Position A, there are several methods to raise the robot into a sitting or a standing operating position. In one method, the wheel can be brought close to a previously estimated CoM gravity axis, and leg joint angles adjusted to raise the NPB. If the CoM is not aligned, the NPB body axis or the leg link axis will deviate from the correct pose compared to the case when CoM aligns to the wheel ground contact point. Similar corrective action can be taken as described above for the sitting to standing pose CoM detection and lift. Once NPB is lifted above the ground, a sequence to leg joint angles can be executed to straighten the NPB or attain any desired pose.

In another method for robot recovery from a fallen position or from a sleeping position, a sequence that uses the manipulator arm to use a ground support and impart reaction force to the NPB through joints in 700, in combination with the leg joint torques and pose, can be used to raise the NPB from sleeping to sitting and subsequently to standing pose or desired pose. For the single arm embodiment this method is illustrated in FIG. 14, from Position A through Position F, with the arrows indicating transition from one position to another and named Transition1 through Transition5. In FIG. 14 Position A, the legs are posed as shown and the manipulator arm is rotated along 700 to contact the ground at the frame enclosing the joint axis 770. A negative torque is applied at 700 and 752 (or appropriate torques at appropriate joints for dual arm at similar joints for left and right arm), a positive torque is applied to the hip joint 310, 311 and a negative torque applied to knee joints 430, 431 and brakes applied on the primary wheels. By continuing to do so will move the robot from position shown in FIG. 14, Position A to Position B and then Position C until is reached where the NPB can now rest vertically on the ground, in a sitting position. Then a similar procedure described earlier can be used to move from sitting to a desired pose. FIG. 14, Position E and Position F illustrates the case when the CoM of the robot is aligned to the wheel-ground contact and the robot can be lifted vertically by following the required leg joint trajectory.

Figure 15A:
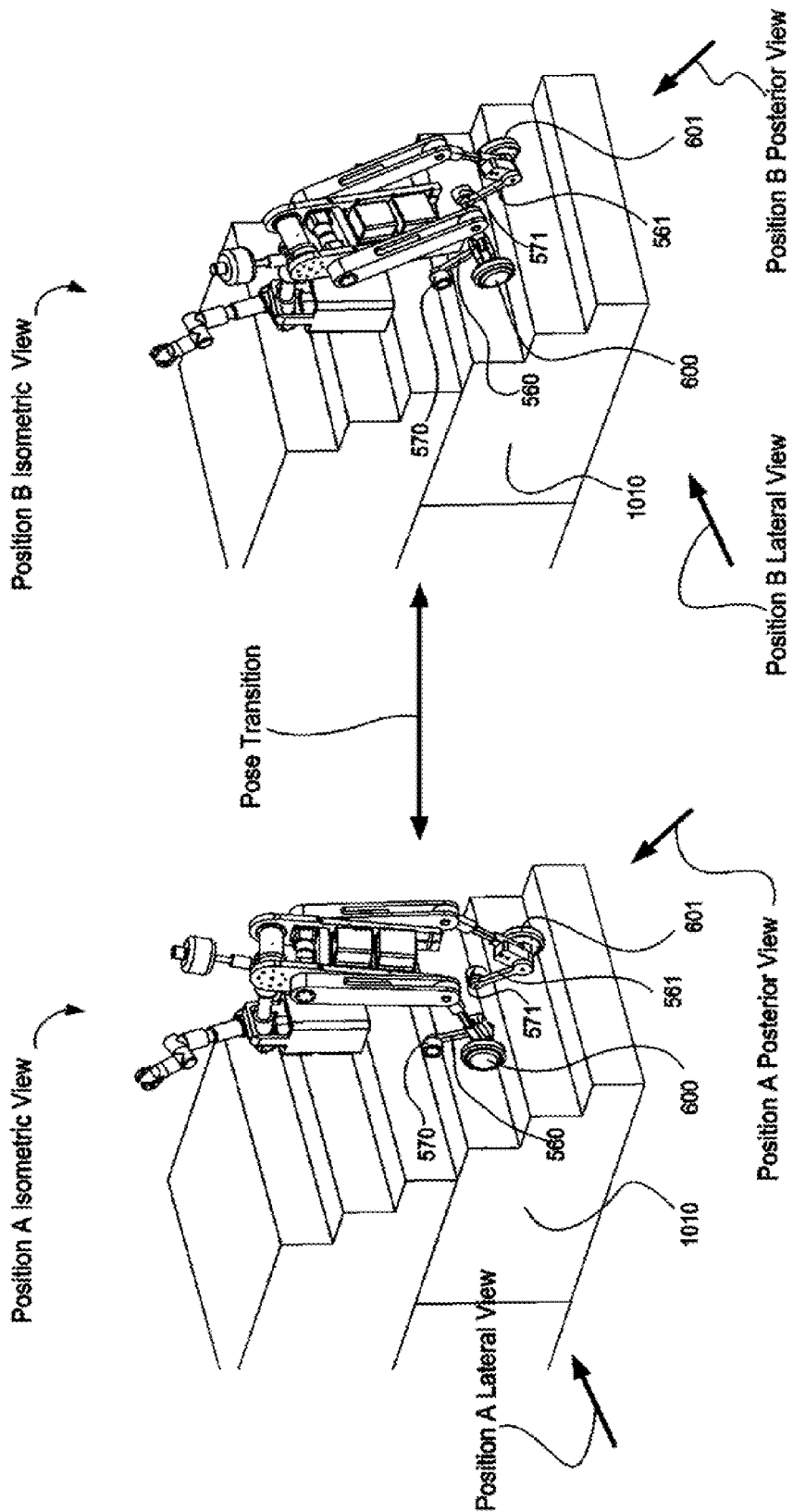
FIG. 15A is the isometric view of an illustration of the robot ascending or descending stairs.
Figure 15B:
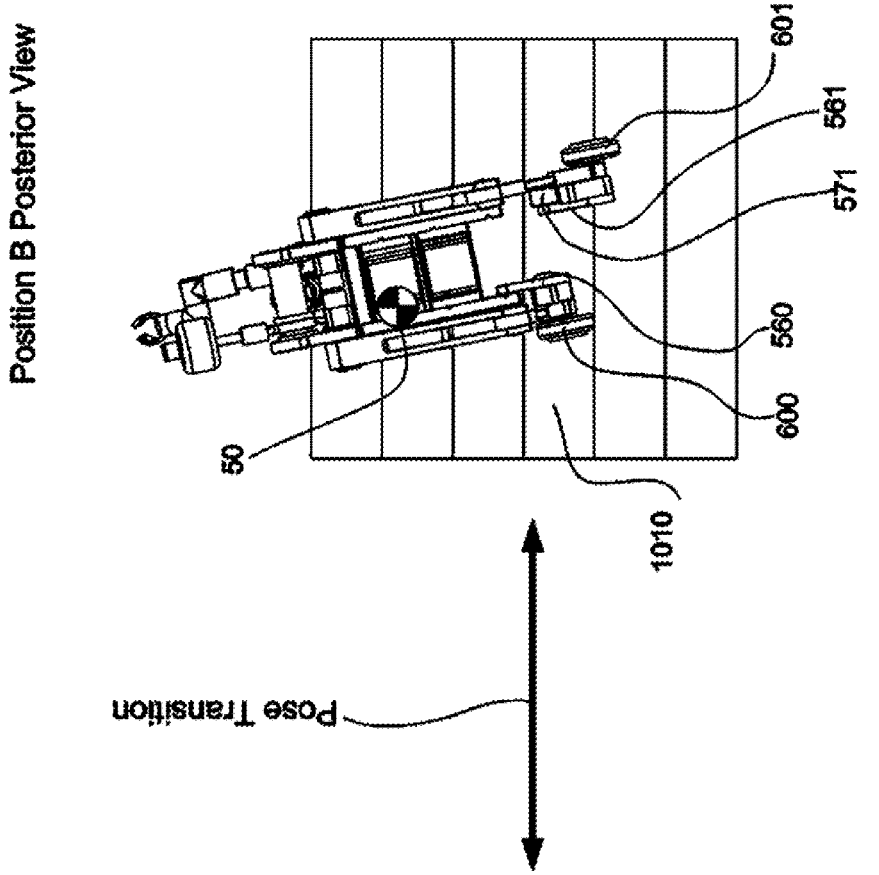
FIG. 15B is the posterior view of the same illustration as in FIG. 15A.
Figure 15B:
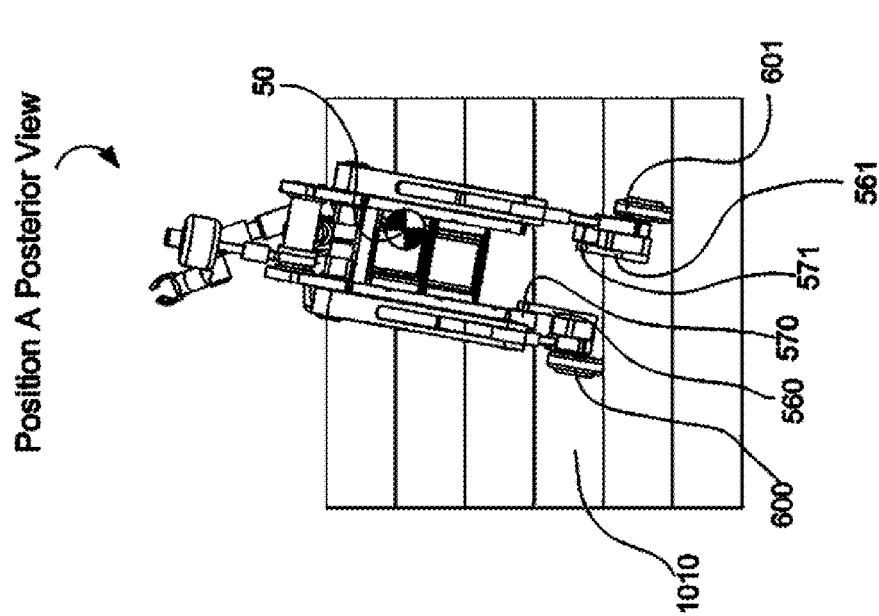

FIG. 15A. FIG. 15B and FIG. 15C illustrates the robot ascending or descending stairs with a payload attached to its arm. All the robots with their different embodiments discussed so far, can balance on one leg with the other leg retracted. This is possible by adjusting the knee and hip joint angles along 300,301 and 420, 410 axis such that the robot leans towards one of the wheels or feet. During the ascending and descending process, the primary wheel is locked to the leg by applying brakes or actuator holding torque and does not rotate freely with respect to the robot legs. This step may be omitted for a footed robot without wheels, but with at least one portion of the foot providing a contact friction with the ground. The ability to hold the CoM on one wheel or foot, can be used to climb stair or any terrain paths. The robot can also adjust the pace of ascending or descending the stairs by adjusting the lean angle. For slow pace, the lean angle (angle between FIG. 8 Y axis of the NPB and the gravitational axis) will be such its CoM is close to one of the wheel/foot ground contact zone coincident with the gravitational axis. FIG. 15B Position A Posterior View shows the robot lean to the right with its CoM lying close to the right wheel. For slow pace, the secondary foot wheel of the robot may also be deployed, and leg joints actuated to shift the robot CoM forward towards the required path (forward for ascending) and the CoM can be statically stable with the CoM lying within the range of deployed primary wheel and the secondary wheel, or foot-ground contact zone if it is a footed robot. Once the CoM is in a stable zone, the other leg can be taken off the ground and deployed to the next contact zone on the stairs. Once that contact is established, the robot can be made to lean towards newly deployed leg zone. FIG. 15C Position A Lateral View shows the wheel 600 being deployed to the next stairs while the robot is still leaning towards the lower wheel 601. FIG. 15B, FIG. 15C Position B shows the robot leaning towards wheel (600) step contact zone. Then the wheel 601 can be lifted off the previous step and deployed to the next or a further step. This process can continue till the robot has reached its destination or is reversing its motion. The descending is exactly a reversible process to ascending.

For a faster pace the robot can lean forward by reducing the lean of its CoM towards one of the wheel ground contact zone. The leg wheel that will be deployed to a new contact zone will be retracted and deployed quickly even though the robot may fall to slightly towards the side of the retracted leg. Leg joint torques are applied to keep the forward and upward ascending motion of the robot. Smaller the leaning angle, the faster should be the robot's pace in deploying the foot or the wheel in the next contact zone, and vice-versa. The maximum pace is determined by the maximum permissible joint torques, static friction between the wheel and stairs, payload etc. FIG. 15A shows a payload 850 carried by the manipulator arm near joint 725 rather than its end effector to reduce the holding torque at 700.

The energy efficient operation when compared to other robots wheeled or humanoids comes from the fact that payloads can be carried in the NPB and the NPB itself can attain a pose such that the gravitational axis passing through the CoM of the whole robot including the payloads can align with the leg long axis (length of the legs) when the legs are in a complete standing position. Most of the weight falls on the bearings rather than the joint actuators (singular position). In this pose the wheeled robot can be as efficient as a four wheeled vehicle carrying heavy loads. Any incremental joint torques needed to adjust the CoM are small as well. This is true for the case when the manipulator is also carrying a heavy load since the effective torque acting on PPJ in a balanced condition will be small, and gravitational axis through the CoM can still stay along the leg axis minimizing any incremental torque the leg joints would need to adjust any pose. Also, while in a standing pose, when the legs are aligned with the CoM of the robot, the robot can extend its reach without having to spend too much energy on its leg joints.

In other alternate embodiments for ground contact, FIG. 16A and FIG. 16B illustrates foot structures that has at least two ground contact points and unlike the robot in FIG. 1, the contact point relative to the ground are not independent of each other and are controlled by the foot joint 555. In FIG. 16A when the structure illustrates the at least two wheels that are in series to a joint 555. This is different from the secondary wheel illustrated earlier in FIG. 1 570, 571. FIG. 16B illustrates the foot structure without wheels and the foot 603, could have at least one or more than one contact with the ground. The addition contacts with the ground will provide flexibility in moving the CoM of the body within ground contact range of the foot. This is similar to the human foot structure and the joint 555 representing the ankle joint. Even though only 1Dof (Degree of Freedom) for the ankle joint is illustrated, it is not a limitation, and multiple degrees of freedom for ankle joints can be implemented without altering the spirit of this invention.

In other alternate embodiments for ground contact, FIG. 16A and FIG. 16B illustrates foot structures that has at least two ground contact points and unlike the robot in FIG. 1, the contact point relative with the ground is dependent are not independent of each other and are controlled by the foot joint 555. In FIG. 16A when the structure illustrates the at least two wheels that are in series to a joint 555. This is different from the secondary wheel illustrated earlier in FIG. 1 570, 571. FIG. 16B illustrates the foot structure without wheels and the foot 603, could have at least one or more than one contact with the ground. The addition contacts with the ground will provide flexibility in moving the CoM of the body within ground contact range of the foot. This is similar to the human foot structure and the joint 555 representing the ankle joint.

As we have seen, the robot with a pendulum body that is suspended below the pivot joint of the leg can be of significant advantage when it comes to carrying or manipulating heavy payloads at low energy. At the same time, the robot by itself can be versatile enough to traverse multiple uneven terrains. While the foregoing disclosure shows many possible embodiments, it should be noted that various changes and modifications could be made herein without departing from the scope and spirit of the invention as defined by the appended claims.

I claim:

1. A mobile legged robot comprising of:
   a non-inverted Pendulum Body (NPB), comprising at least one Primary Pivot Axis (PPA), wherein the PPA divides the NPB into a first portion and a second portion, wherein the first portion contains a center of mass (CoM) of the NPB, and the PPA lies above the CoM of the NPB along a gravitational axis;
   at least one leg having at least a first end and a second end and the first end of the at least one leg is connected to the NPB through a Primary Pivot Joint (PPJ), wherein the at least one leg is rotatabily coupled to the NPB though the PPJ, and the second end of the at least one leg is coupled to at least one drive wheel and wherein the at least one drive wheel contacts ground surface to support the NPB, and wherein the PPJ is actuated by a first actuator to rotate the at least one leg relative to the NPB.

2. The mobile legged robot in claim 1, wherein the at least one leg is connected to one of: at least one foot and at least one foot without wheels, wherein the at least one foot comprises a first end and a second end,
   wherein the first end of the at least one foot is rotatably coupled to the at least one leg through a rotational Joint (RJ),
   the RJ is controlled using a rotary actuator to at least one of: retract a secondary wheel into the at least one leg and deploy the secondary wheel to make contact with the ground surface,
   wherein, the second end of the at least one foot is connected to the secondary wheel.

3. The mobile legged robot in claim 1, wherein the at least one leg is connected to one of: at least one foot and at least one foot without wheels;
   wherein the at least one foot has at least two ends and is in series with a joint rotatably coupled to the at least one leg,
   each end of the at least one foot makes contact to the ground surface by itself providing support and friction relative to the ground surface, and
   the joint connected in series with the at least one foot is used to alter foot angle relative to the ground surface and the at least one leg.

4. The mobile legged robot in claim 1 wherein the at least one leg comprises of:
   a knee joint configured to separate the at least one leg into two portions, wherein the two portions are coupled to each other in one of a prismatically and rotationally through the knee joint,
   the knee joint is driven by a second actuator to alter the distance of the PPA relative to the at least one drive wheel.

5. The mobile legged robot in claim 1:
   comprises of:
   at least two legs and each of the PPJ for each of the at least two legs are separated by a distance along the PPA, and each of the at least two legs are oriented relative to the NPB independently.

6. The mobile legged robot in claim 1, wherein the at least one leg comprises of:
   at least a Second Joint whose axis is perpendicular to PPA and in series with PPJ, and the said second joint and PPJ offer at least two degrees of freedom for the at least one leg, and the at least one of the second joint precedes the PPJ.

7. The mobile legged robot of claim 1, wherein the NPB further comprises:
   mechanical positioning and locking structures that allow payloads to be loaded and locked into, or unlocked and unloaded from, the NPB.

8. The robot of claim 1 further comprising of:
   At least one Manipulator Unit (MU) attached to the second portion of the NPB that does not contain the CoM of the NPB, and the MU is configured to move relative to the NPB, carry external payloads, interact, and exert forces on the environment, inspect and capture environment details; and the MU comprises at least one of one or more open chains, and closed chains, and fixed at a predefined angle relative to the PPA.

9. The mobile legged robot in claim 1 further comprising of:
   sensor units configured to measure Linear and Angular Acceleration, Orientation, Inclination, and Magnetic fields,
   at least one of: Joint Coordinates measurement units, Distance measurement units computation unit and controller unit communicate with each of other sensor units to process pose, velocity, acceleration information of one or more robot joints and links, and send position, velocity, and required commands to each of the joint actuator drivers;

wherein the sensor units configured to provide a robot controller with information including location of the mobile legged robot, location of other objects, joint coordinates and velocities, angle, and orientation of the one or more robot joints and links, and obstruction in operational space of the mobile legged robot.

10. The mobile legged robot in claim 1 further comprising of:
a Head Unit (HU) configured to capture the environment details and information associated with the mobile legged robot, connected to the NPB to move relative to the NPB and, orient independent of the NPB;
at least one computation unit configured to:
infer and process sensor data from the one or more robot joints and links, the HU, and the MU
send captured data to the controller unit and
receive status of the mobile legged robot from the controller unit.

11. The mobile legged robot of claim 1, wherein the NPB further comprises:
picker devices including one of an electro-magnetic device and a vacuum picker device used to pick and attach the payloads into the NPB.

12. The mobile legged robot of claim 1, wherein the NPB further comprises:
mechanical positioning and locking structures that allow payloads to be loaded and locked into, or unlocked and unloaded from, the NPB; and
payload batteries configured to be loaded and unloaded through the mechanical positioning and locking structures, wherein the payload batteries are electrically connected to a robot power supply unit to supply additional power to the mobile legged robot.

13. The mobile legged robot of claim 1, wherein the NPB further comprises:
mechanical positioning and locking structures that allow payloads to be loaded and locked into, or unlocked and unloaded from, the NPB; and
a payload carrier configured to at least one of load and lock, and unload and unlock the payloads through the mechanical positioning and locking structures, wherein the payload carrier is further configured to contain and carry additional objects for transportation.

14. The mobile legged robot of claim 1, wherein the NPB further comprises:
mechanical positioning and locking structures that allow payloads to be loaded and locked into, or unlocked and unloaded from, the NPB;
a payload picker configured to pick and place objects, wherein the payload picker is configured to perform at least one of: load and lock, and unlock and unload through the mechanical positioning and locking structures,
wherein the payload picker upon being loaded into the NPB, electrically or wirelessly connected to the mobile legged robot and controlled by the mobile legged robot to pick and drop the additional objects, and
wherein the payload picker is unloaded when not in use, and
wherein the payload picker contains additional batteries to be used as a power source for at least one of: the payload picker and the mobile legged robot.

15. A method of controlling a mobile legged robot, comprising:
achieving a steady lower energy by:
applying at least one of: torque and braking to avoid NPB oscillations at a primary pivot joint (PPJ), for a primary pivot axis (PPA) to remain substantially coincident with a gravitational axis and a total effective CoM of the mobile legged robot;
maintaining angles of one or more robot joints and links of at least one leg for total effective CoM of the mobile legged robot to align with the gravitational axis passing through a ground surface.

16. The method of controlling the mobile legged robot in claim 15, further comprising:
altering a PPJ angle for the gravitational axis to pass through the total effective CoM of a non-inverted pendulum body (NPB), a Manipulator Unit (MU), at a non-zero distance from the PPA, to dynamically balance reaction forces generated by the MU.

17. The method of controlling the mobile legged robot in claim 15, further comprising:
positioning the NPB in a vertically stable position by aligning Center of Mass (CoM) of the NPB to the PPA;
aligning the CoM of the mobile legged robot to a required position relative to the ground surface;
moving the mobile legged robot to the location of payloads;
aligning the NPB of the mobile legged robot with that of the payloads;
lowering the NPB using the PPJ and Knee joint rotation;
securing the payloads into the NPB;
lifting the NPB by adjusting the PPJ and the angles of the Knee Joint;
moving the mobile legged robot to a predefined location; and
unload the payloads by reversing a loading process.

18. The method of controlling the mobile legged robot in claim 15, comprising:
moving the mobile legged robot towards a payload picker;
vertically positioning the NPB above the payload picker;
attaching the payload picker to the NPB;
securing the payload picker to the NPB;
moving to a first location of a new payload to be picked;
aligning the payload picker to the new payload using a payload picker mechanism;
moving to a second location; and
dropping off the new payload by using a payload picker release mechanism.

19. The method of controlling the mobile legged robot in claim 15, further comprises:
vertically positioning the NPB;
moving the mobile legged robot horizontally towards the payloads;
aligning at least one of: first mechanical guides and first rails of the payload carrier in the NPB to the at least one of: second rails and second mechanical guides of the payloads;
moving the NBP horizontally until the payloads start sliding into the NPB;
securing by locking the payloads upon positioning of the payloads;
moving to a second location; and
unloading the payloads by reversing the loading process.

20. The method of controlling the mobile legged robot in claim 15, wherein for transitioning the mobile legged robot from horizontal position of the NPB on the ground surface to a standing position on the ground surface followed by a sitting position comprises:
rotating a base joint of the MU to bring a portion of the MU in contact with the ground surface, and applying torque in one or more arm joints along with the base joint of the MU such that reaction force exerted by friction between the ground surface and the MU, lifts the NPB that contains the base joint until the NPB attains the sitting position and rests on the ground surface, upon the NPB attaining the sitting position, one of: the foot and the wheels are deployed around the CoM of the robot and leg joint torques are activated to raise the mobile legged robot to the standing position.

21. The method of controlling the mobile legged robot in claim 15, wherein for transitioning the mobile legged robot from the horizontal position of the NPB on the ground surface to the standing position on the ground surface followed by the sitting position comprises:

when the mobile legged robot is in the horizontal position, moving leg joint coordinates such that the at least one of: foot and the at least one drive wheel contacts the ground surface;

moving the leg joint coordinates such that at least one of the PPA and the CoM of the mobile legged robot follows a vertical trajectory away from the ground surface; and upon the mobile legged robot being lifted to a suitable height, maneuvering the leg joint coordinates to attain the standing position.

22. The method of controlling the mobile legged robot in claim 15, wherein for walking of the mobile legged robot further comprises of:

adjusting the CoM of the mobile legged robot towards a first ground contact zone of a first leg by altering the joint angles of each of the at least two legs, causing the mobile legged robot to lean towards the first ground contact zone of the first leg;

moving a second leg to make contact at a second ground contact zone and subsequently moving the CoM of the robot towards the second ground contact zone; and continuing the process by moving the first leg to a third ground contact zone.

23. The method of controlling the mobile legged robot in claim 15, further comprising:

attaching one or more additional robots to the mobile legged robot, wherein the one or more Additional Robots are one of: the payloads capable of self-transportation, and a second mobile legged robot, upon attaching, the one or more Additional Robots function as at least one of: a power source to the mobile legged robot, and a ground support through one or more ground contact points including the at least one of: foot and a wheel of the one or more Additional Robots.

24. A mobile legged robot comprising of:

a non-inverted Pendulum Body (NPB), comprising at least one Primary Pivot Axis-(PPA), wherein the PPA divides the NPB into a first portion and a second portion, wherein the first portion contains a center of mass (CoM) of the NPB, and the PPA lies above the CoM of the NPB along a gravitational axis;

at least one leg having at least a first end and a second end and the first end of the at least one leg is connected to the NPB through a Primary Pivot Joint (PPJ), wherein the at least one leg is rotatabily coupled to the NPB though the PPJ, and the second end of the at least one leg is coupled to at least one drive wheel and wherein the at least one drive wheel contacts ground surface to support the NPB, and wherein the PPJ is actuated by a first actuator to rotate the at least one leg relative to the NPB; and at least one Manipulator Unit (MU) attached to the second portion of the NPB that does not contain the CoM of the NPB, and the MU is configured to move relative to the NPB, carry external payloads, interact, and exert forces on the environment, inspect and capture environment details; and the MU comprises at least one of: one or more open chains, and closed chains, and fixed at a predefined angle relative to the PPA, wherein a first axis of the at least one MU is configured to one of: coincides with PPA and be positioned at a distance from the PPA in the at least one of: first portion of the NPB and the second portion of the NPB.

* * * * *